United States Patent
Gildea et al.

(10) Patent No.: US 7,940,834 B2
(45) Date of Patent: May 10, 2011

(54) SIGNAL RECEIVER USING DATA BIT SEARCH IN ALTERNATING TIME SEGMENTS

(75) Inventors: David R. Gildea, Menlo Park, CA (US); Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 569 days.

(21) Appl. No.: 12/152,614

(22) Filed: May 15, 2008

(65) Prior Publication Data
US 2009/0285268 A1 Nov. 19, 2009

(51) Int. Cl.
H04B 1/69 (2011.01)
H04B 1/707 (2011.01)
H04B 1/713 (2011.01)

(52) U.S. Cl. ........ 375/149; 375/150; 375/145; 375/142; 375/147; 708/422

(58) Field of Classification Search .................. 375/149, 375/150, 147, 145, 142, 343; 708/422
See application file for complete search history.

(56) References Cited

U.S. PATENT DOCUMENTS

| | | | |
|---|---|---|---|
| 5,577,025 A | 11/1996 | Skinner et al. | |
| 5,852,630 A | 12/1998 | Langberg et al. | |
| 6,047,017 A | 4/2000 | Cahn et al. | |
| 6,160,841 A | 12/2000 | Stansell, Jr. et al. | |
| 6,317,452 B1 | 11/2001 | Durrant et al. | |
| 6,466,958 B1 * | 10/2002 | Van Wechel et al. | ......... 708/422 |
| 6,606,346 B2 | 8/2003 | Abraham et al. | |
| 6,650,689 B1 | 11/2003 | Oishi et al. | |
| 6,735,243 B1 | 5/2004 | Akopian | |
| 6,795,771 B2 | 9/2004 | Fuchs et al. | |
| 6,888,879 B1 | 5/2005 | Lennen | |
| 6,898,234 B1 * | 5/2005 | Yu et al. | ......... 375/149 |
| 6,970,500 B1 * | 11/2005 | Sanders | ......... 375/150 |
| 6,990,140 B2 | 1/2006 | Loomis et al. | ......... 375/148 |
| 7,027,486 B2 | 4/2006 | Sullivan | ......... 375/147 |
| 7,348,921 B2 | 3/2008 | Yu | |
| 7,365,681 B2 | 4/2008 | Yu | |
| 2001/0009563 A1 | 7/2001 | Kohli et al. | |
| 2003/0223477 A1 * | 12/2003 | Loomis et al. | ......... 375/147 |
| 2005/0276316 A1 | 12/2005 | Rabaeijs et al. | |

OTHER PUBLICATIONS

USPTO action document mailed Feb. 8, 2005 for U.S. Appl. No. 09/860,125, 12 pages.
USPTO action document mailed Aug. 26, 2005 for U.S. Appl. No. 09/860,125, 13 pages.
USPTO action document mailed Sep. 22, 2005 for U.S. Appl. No. 09/860,125, 7 pages.
USPTO action document mailed Nov. 28, 2006 for U.S. Appl. No. 11/259,836, 12 pages.

(Continued)

Primary Examiner — Phuong Phu
(74) Attorney, Agent, or Firm — David R. Gildea

(57) ABSTRACT

A GNSS receiver and method using alternating "A" and "B" time segments for a reception time length of two or more data bits. The GNSS signal in an "A" time period comprising the "A" time segments is integrated for determining "A" magnitudes corresponding to code phase increments and the GNSS signal in a "B" time period comprising the "B" time segments is integrated for determining "B" magnitudes corresponding to code phase increments. A trial-and-error data bit search is performed for depolarizing data bit senses. The code phase increment showing the largest correlation level is used for acquisition of the GNSS signal and/or determination of the location where the GNSS is being received.

24 Claims, 23 Drawing Sheets

OTHER PUBLICATIONS

USPTO action document mailed Jan. 11, 2007 for U.S. Appl. No. 11/259,836, 6 pages.
USPTO action document mailed Feb. 7, 2008 for U.S. Appl. No. 11/7107,15, 12 pages.
USPTO action document mailed Jul. 11, 2008 for U.S. Appl. No. 11/710,715, 16 pages.
USPTO action document mailed Dec. 30, 2008 for U.S. Appl. No. 11/710,715, 12 pages.
USPTO action document mailed Jan. 28, 2009 for U.S. Appl. No. 11/710,715, 2 pages.
USPTO action document mailed Mar. 30, 2009 for U.S. Appl. No. 11/710,715, 6 pages.
USPTO action document mailed Jan. 25, 2005 for U.S. Appl. No. 09/893,179, 10 pages.
USPTO action document mailed Oct. 26, 2007 for U.S. Appl. No. 11/059182, 15 pages.
USPTO action document mailed Mar. 14, 2008 for U.S. Appl. No. 11/059,182, 11 pages.
USPTO action document mailed Jul. 2, 2008 for U.S. Appl. No. 11/059,182, 14 pages.
USPTO action document mailed Aug. 21, 2008 for U.S. Appl. No. 11/059,182, 2 pages.
USPTO action document mailed Nov. 28, 2008 for U.S. Appl. No. 11/059,182, 8 pages.
PCT, WO 02/093772 A2 published Nov. 21, 2002 for application PCT/US02/09780, 81 pages.
PCT, International Search Report mailed Nov. 12, 2002 for application PCT/US02/09780, publication No. WO 02/093772 A3, 4 pages.
PCT, International Preliminary Examination Report completed Jul. 20, 2005 for application PCT/US02/09780, 5 pages.
EPO, Examination Report dated Oct. 26, 2006 for application 02 725 418.4-2411, 4 pages.

\* cited by examiner

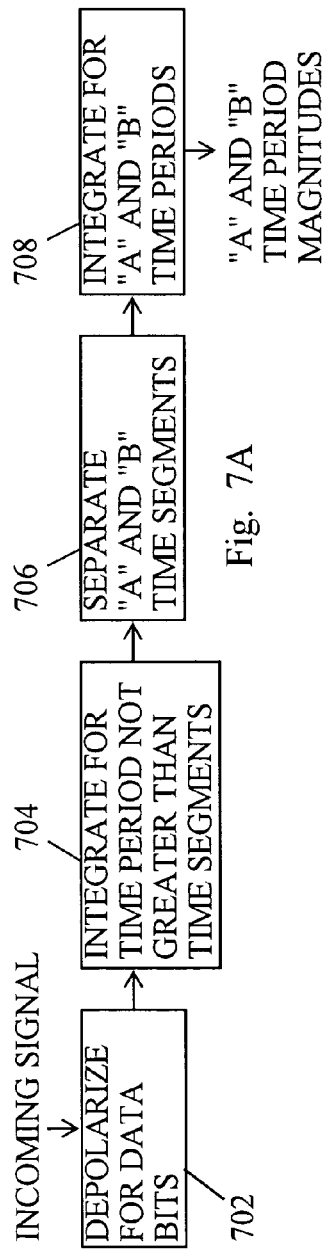
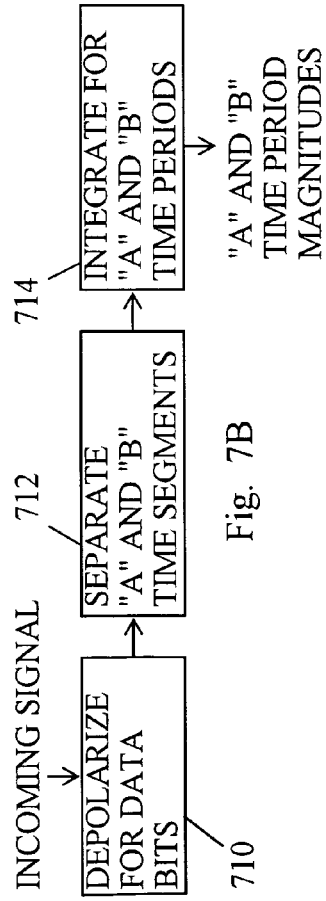
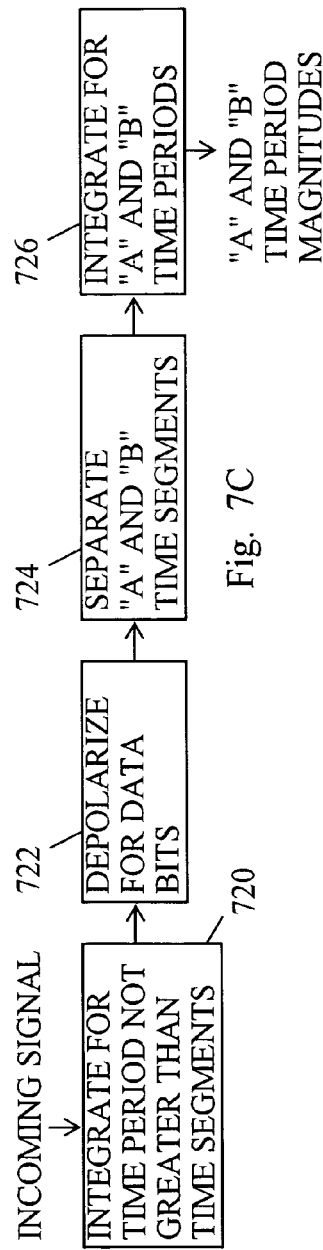
Fig. 7A
Fig. 7B
Fig. 7C

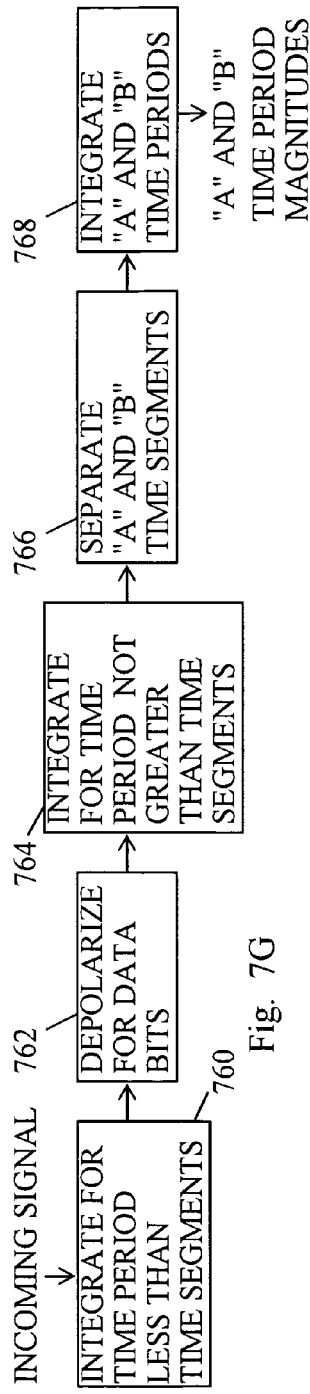
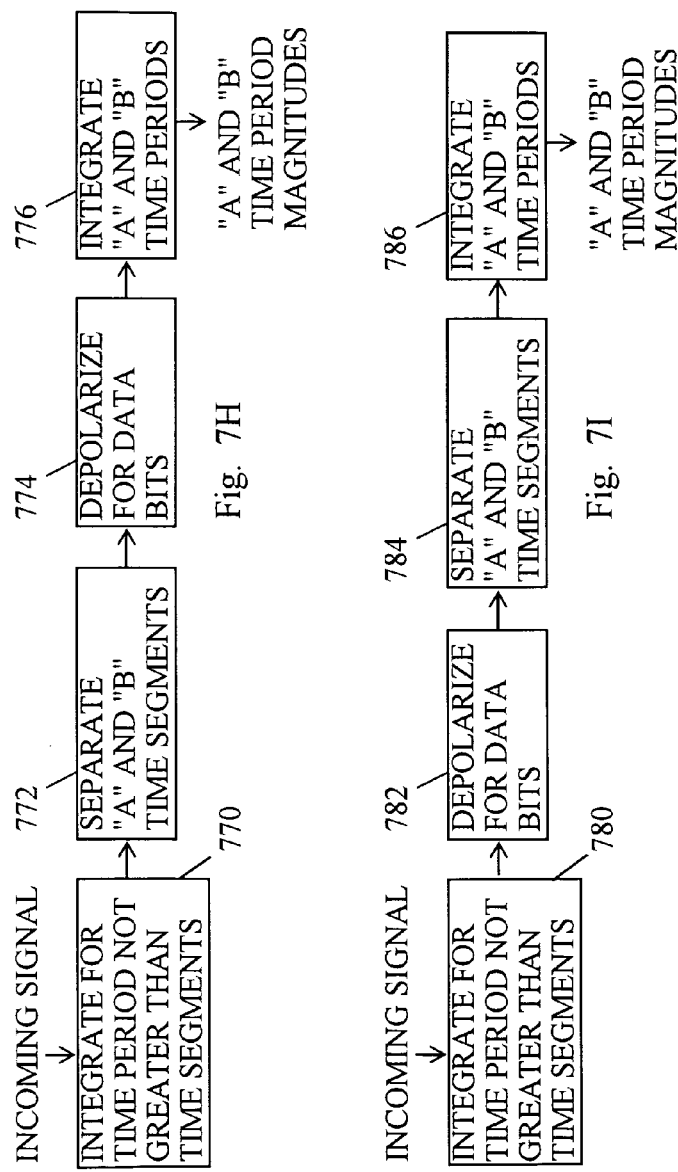
Fig. 7G
Fig. 7H
Fig. 7I

SIGNAL RECEIVER USING DATA BIT SEARCH IN ALTERNATING TIME SEGMENTS

BACKGROUND OF THE INVENTION

1. Field of the Invention

The invention relates generally to a global positioning system (GPS) receiver and more particularly for a GPS receiver integrating a GPS signal for an "A" time period having "A" time segments and integrating the GPS signal for a "B" time period having "B" time segments, where the "A" time segments and the "B" time segments alternate, for signal acquisition at a low signal strength.

2. Description of the Background Art

The global positioning system (GPS) is a system using GPS satellites for broadcasting GPS signals having information for determining location and time. Each GPS satellite broadcasts a GPS signal having 20 milliseconds (ms) GPS data bits modulated by a 1 ms pseudorandom noise (PRN) code having 1023 bits or chips. The PRN code for each GPS satellite is distinct, thereby enabling a GPS receiver to distinguish the GPS signal from one GPS satellite from the GPS signal from another GPS satellite. The 20 ms GPS data bits are organized into a frames of fifteen hundred bits. Each frame is subdivided into five subframes of three hundred bits each.

Typically, when the GPS receiver is first turned on, it knows its own approximate location, an approximate clock time, and almanac or ephemeris information for the locations-in-space of the GPS satellites as a function of clock time. The GPS receiver processes the approximate time, its approximate location, and the almanac or ephemeris information to determine which of the GPS satellites should be in-view and generates one or more GPS replica signals having carrier frequencies and a pseudorandom noise (PRN) codes matching the estimated Doppler frequencies and the PRN codes of one or more of the in-view GPS satellites. The GPS receiver correlates the carrier frequency, the PRN code, and the PRN code phase of the incoming GPS signal to the replica signals and then accumulates a correlation level. The process of correlation and accumulation may need to be repeated many times until a correlation level is found that exceeds a correlation threshold, thereby indicating GPS signal acquisition for the frequency, code, and code phase of the replica signals.

The incoming GPS signal has a low signal-to-noise ratio because of the spreading effect of the PRN code. The effect of the correlation and accumulation process for despreading 1 ms or an epoch of the spread GPS signal is to increase the signal-to-noise in order to be able to recognize the GPS data bits. This increase in signal-to-noise that results from the despreading is termed processing gain. Additional processing gain can sometimes be achieved by correlating and accumulating several epochs of the PRN code.

When signal acquisition is achieved the GPS receiver monitors the GPS data bits until a hand over word (HOW) at the start of the subframe is recognized. When the HOW is recognized, the GPS receiver reads time of week (TOW) in the GPS data bits in the HOW to learn a GPS-based clock time. A current precise location-in-space of the GPS satellite is then calculated from the GPS-based clock time and the ephemeris information. The code phase of the GPS replica signal is then used to calculate a pseudorange between the location of the GPS receiver and the location-in-space of the GPS satellite. Typically, the ephemeris information is retained in memory in the GPS receiver from a previous operational mode or is determined by reading additional GPS data bits. The geographical location fix is derived by linearizing the pseudorange about the range between the location-in-space of the GPS satellite and the approximate location of the GPS receiver and then solving four or more simultaneous equations having the locations-in-space and the linearized pseudoranges for four or more GPS satellites.

The global positioning system is commonly used for determining geographical location and/or time in commercial applications including navigation, timing, mapping, surveying, machine and agricultural control, vehicle tracking, and marking locations and time of events. Given such wide commercial application, it is clear that GPS receivers provide a good value for many users. However, the global positioning system has been limited in several potential applications because existing GPS receivers are unable to acquire a GPS signal unless the GPS signal has a relatively clear line of sight to the GPS satellites ensuring strong GPS signals. Typically, this is not a problem where the GPS receiver is mounted on a platform such as a ship, airplane, farm tractor, or a vehicle traveling on an open highway. However, the signal strength requirements of GPS receivers make it difficult to use GPS indoors or where the GPS signal may be weak due to the attenuation of passing through buildings or trees.

In order to increase the strength of the GPS signal within the GPS receiver, workers in the art use techniques for increasing the processing gain above the standard processing gain that occurs by despreading a single epoch of the 1 ms PRN code. For example, the additional processing gain for integrating (correlating and accumulating) ten coherent epochs is $10 \log_{10} 10 = 10$ decibels (dB) and the increased processing gain for one-hundred coherent epochs is $10 \log_{10} 100 = 20$ decibels (dB). It would seem that one should increase the number of despread epochs indefinitely until enough processing gain is achieved for overcoming the GPS signal attenuation caused by buildings and trees. Unfortunately, every 20 ms the C/A PRN code may be inverted with a new GPS data bit, thereby nullifying the processing gain for integration times beyond 20 ms. Accordingly, there continues to be a need for improvements in GPS receivers and methods for acquisition of weak GPS signals.

SUMMARY OF THE INVENTION

In order to more easily follow the summaries of first and second embodiments, the reader may first want to refer to FIGS. 12A and 12B.

A first embodiment is a method for receiving an incoming signal having data bits spread by a spreading code, comprising: integrating the incoming signal at code phase increments of the spreading code with two or more data bit search patterns in an "A" integration time period comprising at least two non-contiguous "A" time segments for determining magnitudes corresponding to the code phase increments, respectively, for each of the search patterns; integrating the incoming signal at the code phase increments with the search patterns for a "B" integration time period comprising "B" time segments alternating with the "A" time segments for determining magnitudes corresponding to the code phase increments, respectively, for each of the search patterns; and using a largest of the magnitudes for determining a particular one of the code phase increments for receiving the incoming signal.

A second embodiment is a receiver for acquiring an incoming signal having data bits spread by a spreading code, comprising: a correlation machine to integrate the incoming signal at code phase increments of the spreading code with two or more data bit search patterns in an "A" integration time period comprising at least two non-contiguous "A" time segments for determining magnitudes corresponding to the code phase increments, respectively, for each of the search patterns; the correlation machine further to integrate the incoming signal at the code phase increments with the search patterns for a "B" integration time period comprising "B" time segments alternating with the "A" time segments for determining magnitudes corresponding to the code phase increments, respectively, for each of the search patterns; and a navigation signal processor configured to use a largest of the magnitudes for determining a particular one of the code phase increments for receiving the incoming signal.

Systems that use the first and second embodiments are illustrated in FIGS. 10, 11A-B, 12A-B, 13, 14 and 15 and described in detail in the accompanying detailed textual descriptions. Further descriptive material is illustrated in FIGS. 1A-B, 2, 3, 4, 5, 6A-F, 7A-I, 8 and 9 and described in detail in the accompanying detailed descriptions.

Briefly, this descriptive material shows a way to acquire a signal having data bits spread by a spreading code even when the spread spectrum signal is weak by integrating the signal in separate interleaved time periods termed "A" and "B" time periods where the "A" time period includes "A" time segments and the "B" time period includes "B" time segments that alternate with the "A" time segments. Known polarities of expected data bits having a known expected reception time period are used to invert or not invert (depolarize) the signal separately for each time segment. By constructing the time segments to be one-half a data bit period, at least one of the "A" and "B" time segments avoids transitions in the GPS data bits, thereby enabling a continuous integration without the nullifying effect of inversions of the data bits. An embodiment is described in terms of a spread spectrum global positioning system (GPS) signal. In order to more easily follow the summaries of embodiments, the reader may first want to refer to FIGS. 6A-E.

This material further shows the polarities of certain 20 millisecond (ms) GPS data bits are known beforehand and their expected reception times are known to within ±10 ms. "A" time segments of 10 ms and "B" time segments of 10 ms alternate. The GPS signal in each of the 10 ms "A" time segments is depolarized according to the known polarities of the expected GPS data bits. Likewise, the GPS signal each of the 10 ms "B" time segments is depolarized according to the known polarities of the same GPS data bits. After accounting for polarities of the expected data bits, the GPS signal during an "A" time period including all the 10 ms "A" time segments is coherently integrated (accumulated) for providing an "A" time period magnitude for each potential code phase of a pseudorandom (PRN) spreading code of the GPS signal. Likewise, the GPS signal during a "B" time period including all the 10 ms "B" time segments is coherently integrated for providing a "B" time period magnitude for each potential GPS code phase. The strongest of the time period magnitudes is detected and then compared to a correlation threshold. When the threshold is exceeded, the GPS code phase that yielded the strongest time period magnitude is used for GPS signal acquisition.

This material further shows "A" time period may also include "A" augmentation time segments corresponding to certain "B" time segments when consecutive data bits have no change in polarity. Likewise, the "B" time period may also include certain "B" augmentation time segments corresponding to certain "A" time segments when consecutive data bits have no change in polarity.

In a time domain version of this material, the GPS signal is integrated by accumulating correlation levels for the "A" time period and the "B" time period at each potential code phase for providing the "A" time period magnitudes and the "B" time period magnitudes, respectively. In a frequency domain version of this material, the "A" time period magnitudes and the "B" time period magnitudes are integrated for each potential code phase using fast Fourier transform (convolution) techniques.

This material further shows each of the 10 ms "A" and "B" time segments includes 10 epochs for the 1 ms GPS spreading code. An advantage of this is that a large signal processing gain is achieved due to the length of time of the "A" time period (or the "B" time period), thereby improving the probability of rapid acquisition of a weak signal.

This material further shows a number N of types of alternating time segments, where the "A" and "B" alternating time segments represents an embodiment for N=2. For example for N=4 (FIG. 6F), "A", "B", "C", and "D" time segments, each time segment having one-half a data bit time period, alternate for an expected reception time period for a sequence of known data bits. Increasing the number N of types of time segments allows a tradeoff that increases the tolerance for time error at the expense of reducing the processing gain.

This material further shows a method for receiving an incoming signal having data bits spread by a spreading code, comprising: integrating two of more data bit each results for the incoming signal in an "A" time period comprising "A" time segments for determining "A" magnitude sets corresponding to the search results, respectively, the "A" magnitude sets comprising "A" magnitudes corresponding to code phase increments for the incoming signal; integrating the data bit search results in a "B" time period comprising "B" time segments, the "B" time segments alternating with the "A" time segments, for determining "B" magnitude sets corresponding to the search results, respectively, the "B" magnitude sets comprising "B" magnitudes corresponding to code phase increments for the incoming signal; and using a strongest of the "A" and "B" magnitudes for determining a particular one of the code phase increments for receiving the incoming signal.

This material further shows a receiver for acquiring an incoming signal having data bits spread by a spreading code, comprising: a correlation machine to integrate two of more data bit search results for the incoming signal in an "A" time period comprising "A" time segments to determine "A" magnitude sets corresponding to the search results, respectively, the "A" magnitude sets comprising "A" magnitudes corresponding to code phase increments for the incoming signal; the correlation machine to integrate the data bit search results in a "B" time period comprising "B" time segments, the "B" time segments alternating with the "A" time segments, to determine "B" magnitude sets corresponding to the search results, respectively, the "B" magnitude sets comprising "B" magnitudes corresponding to code phase increments for the incoming signal; and a navigation signal processor configured to use a strongest of the "A" and "B" magnitudes for determining a particular one of the code phase increments for receiving the incoming signal.

These and other embodiments of the present invention will no doubt become obvious to those of ordinary skill in the art after having read the following detailed description of the embodiments which are illustrated in the various figures.

IN THE DRAWINGS

Figure 8:
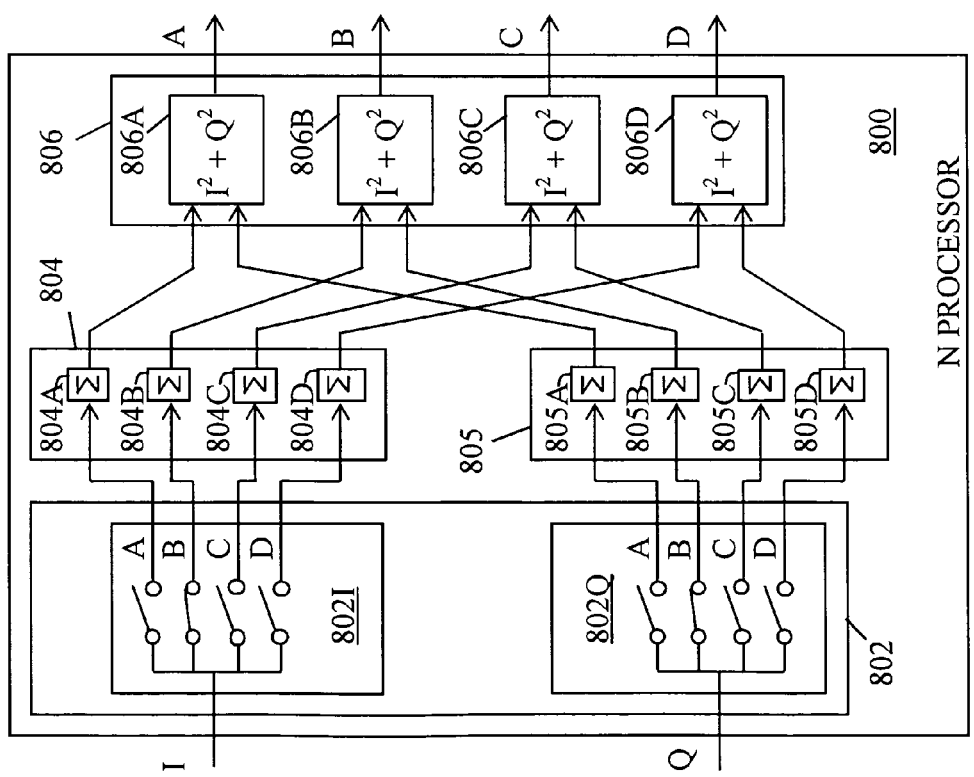
Figure 9:
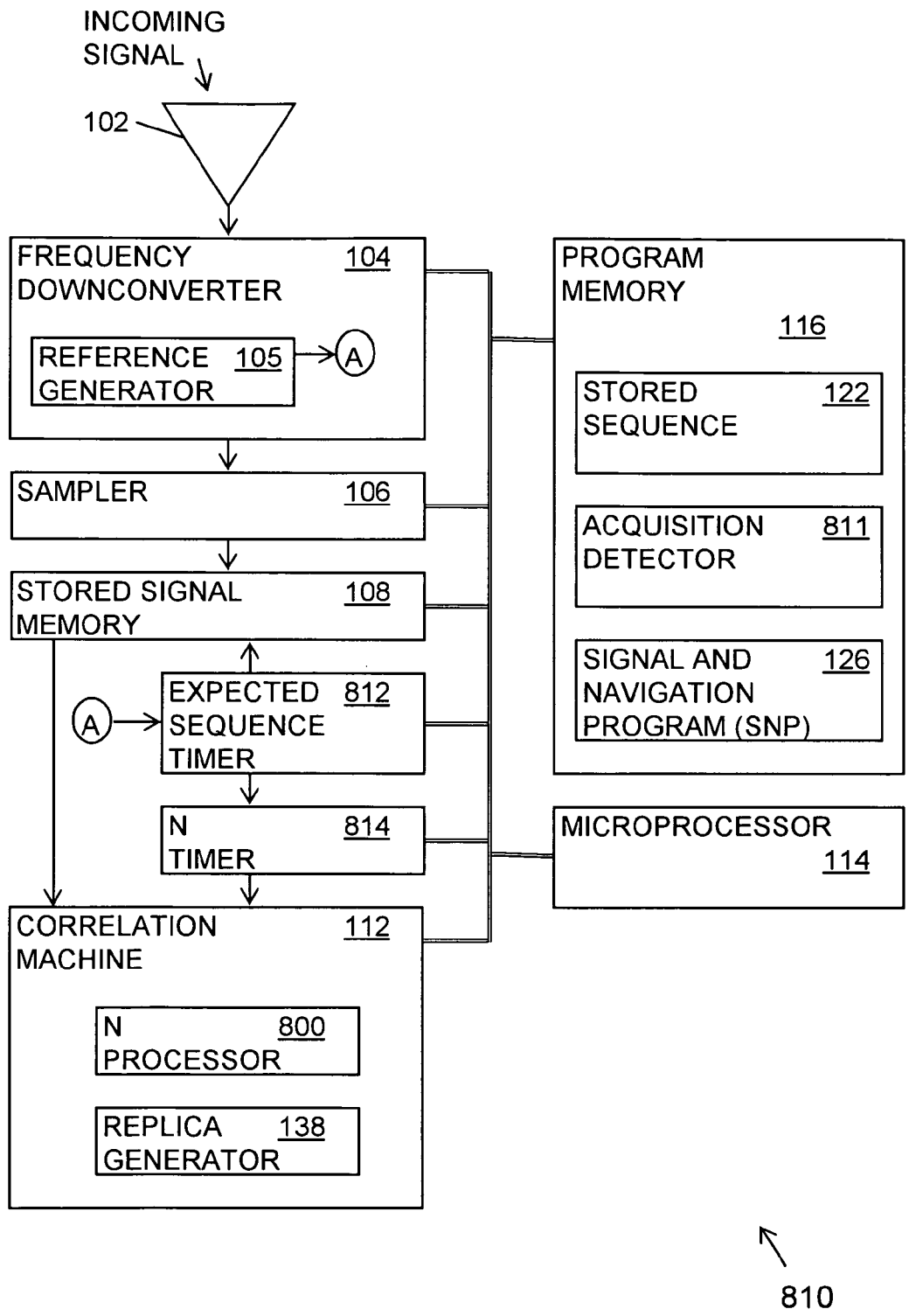
Figure 10:
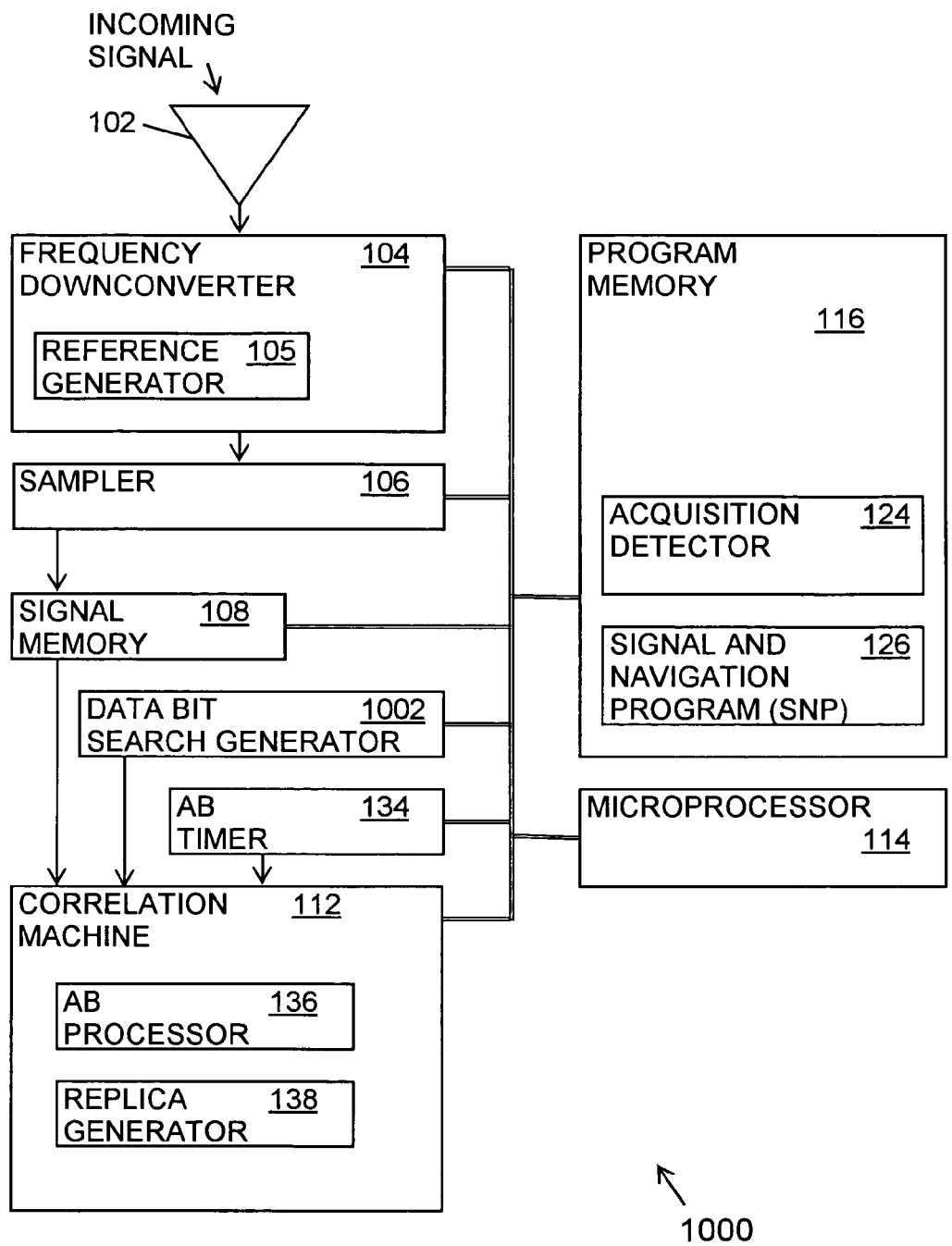
Figure 11A:
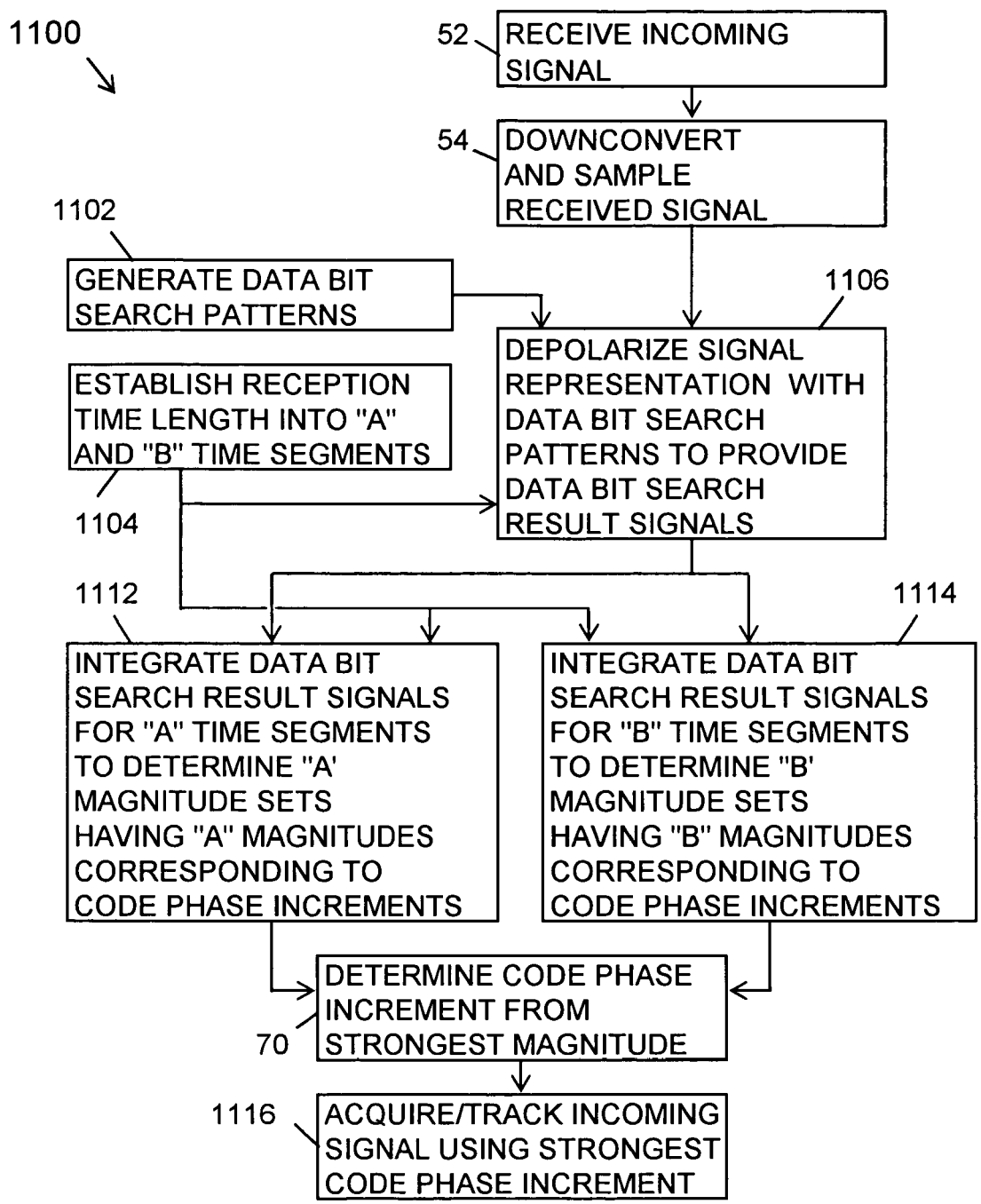
Figure 11B:
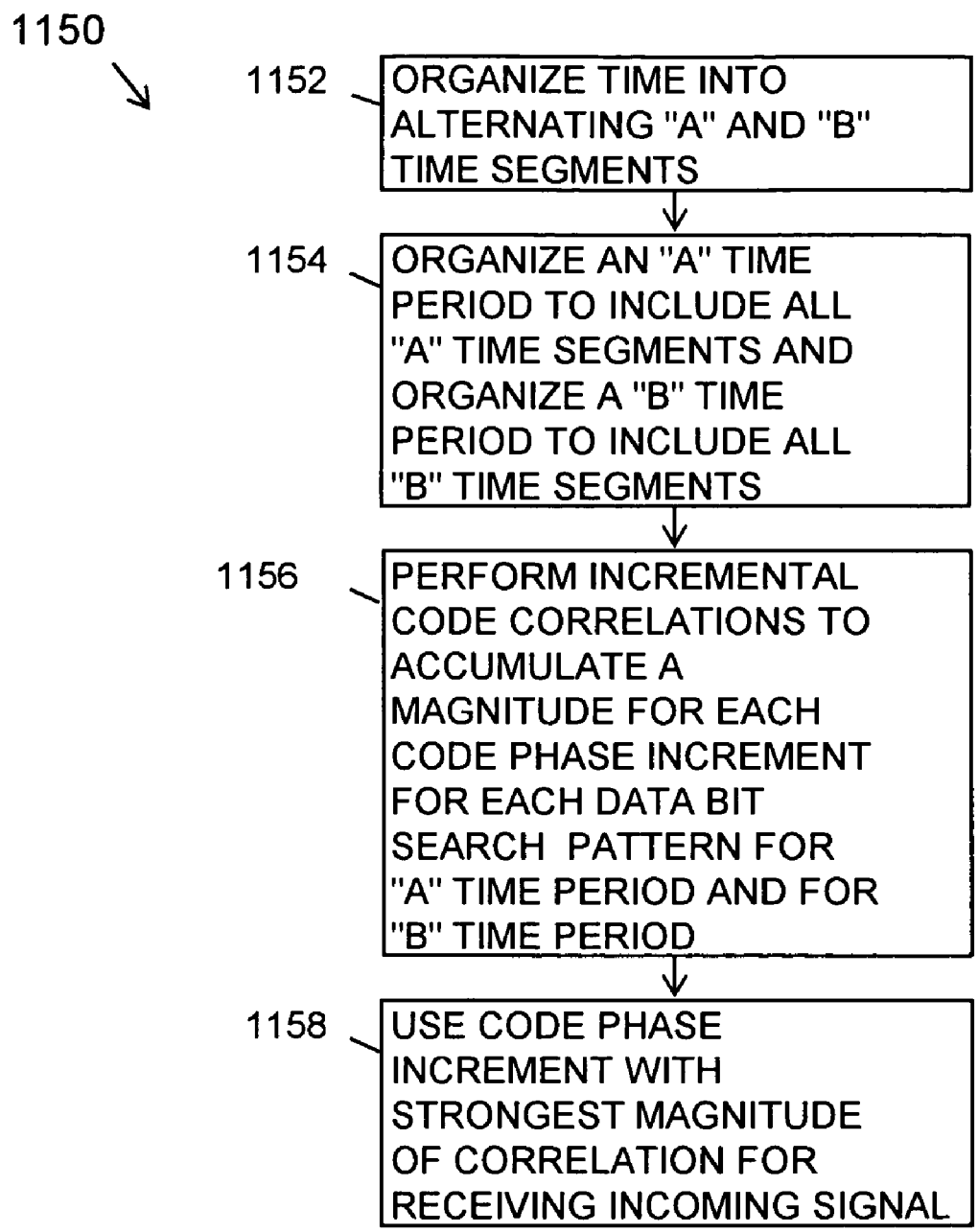
Figure 12A:
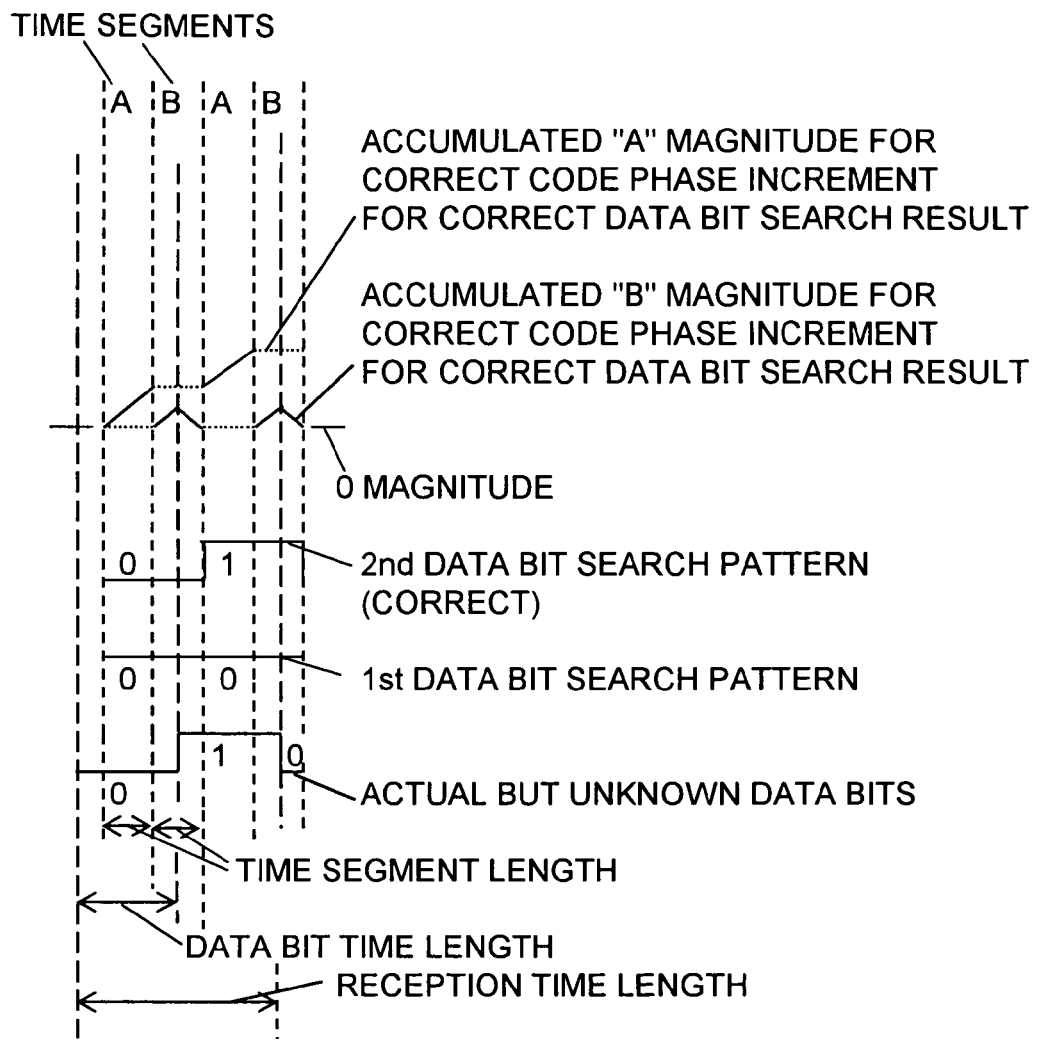
Figure 12B:
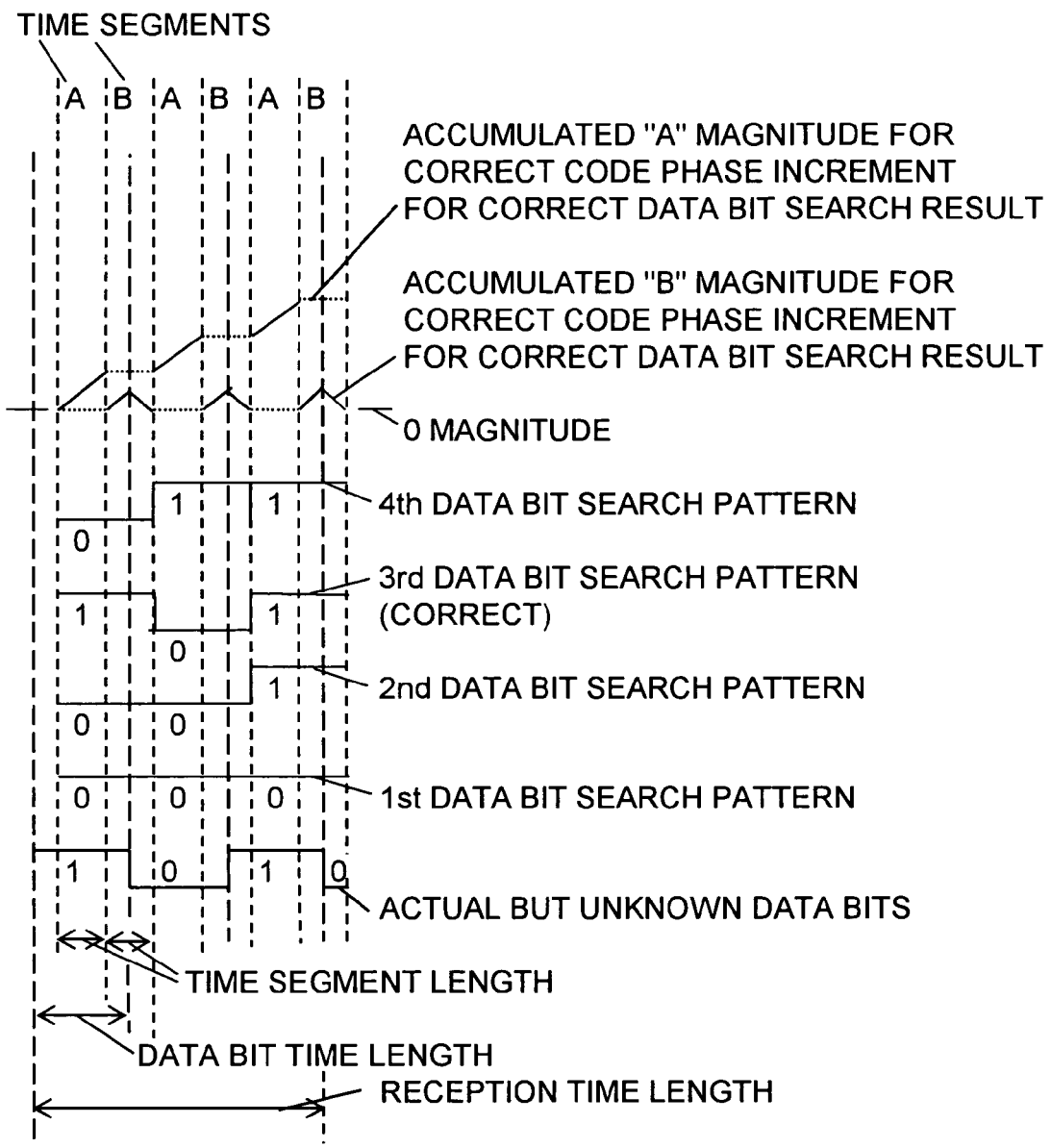
Figure 13:
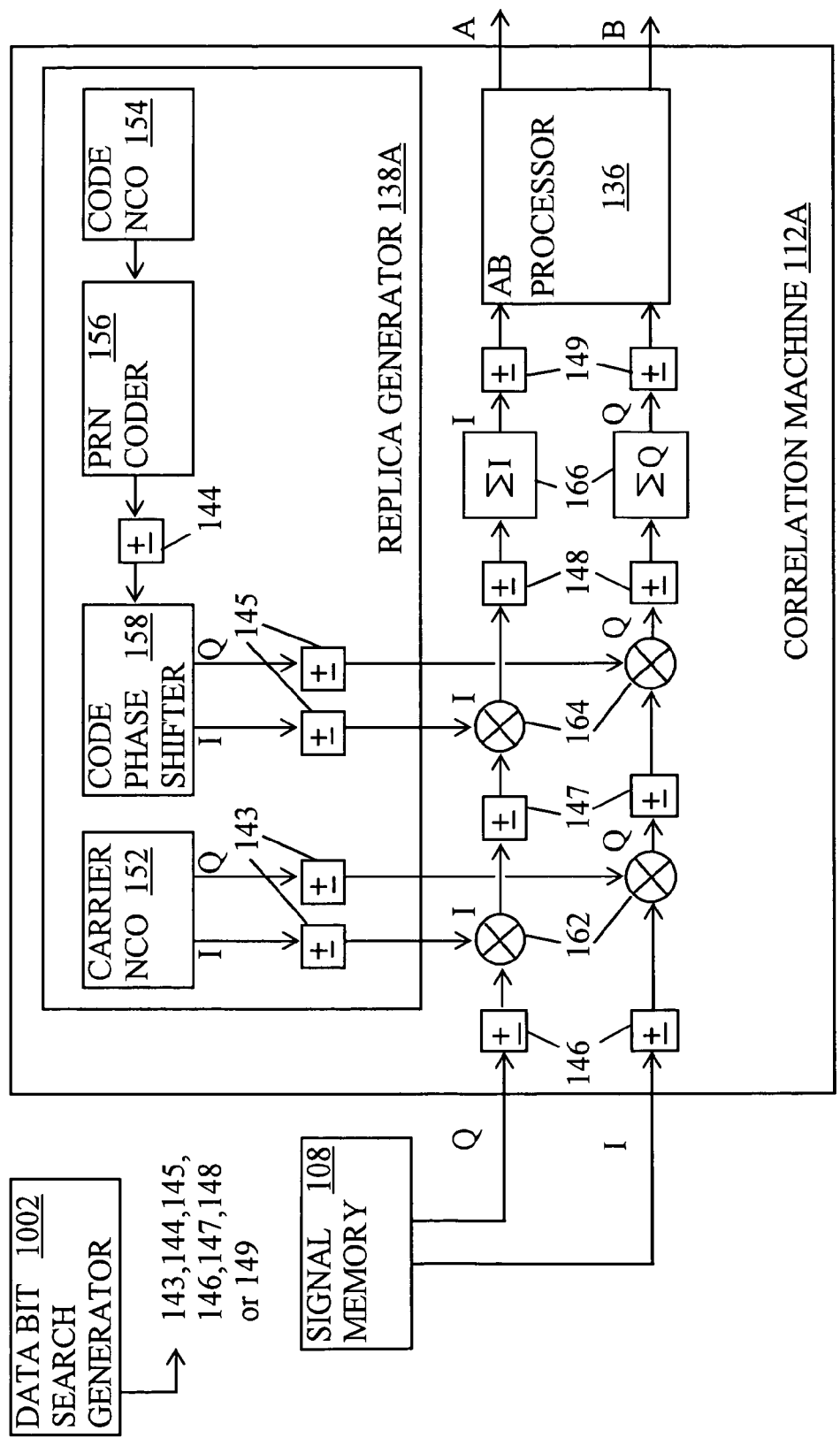
Figure 14:
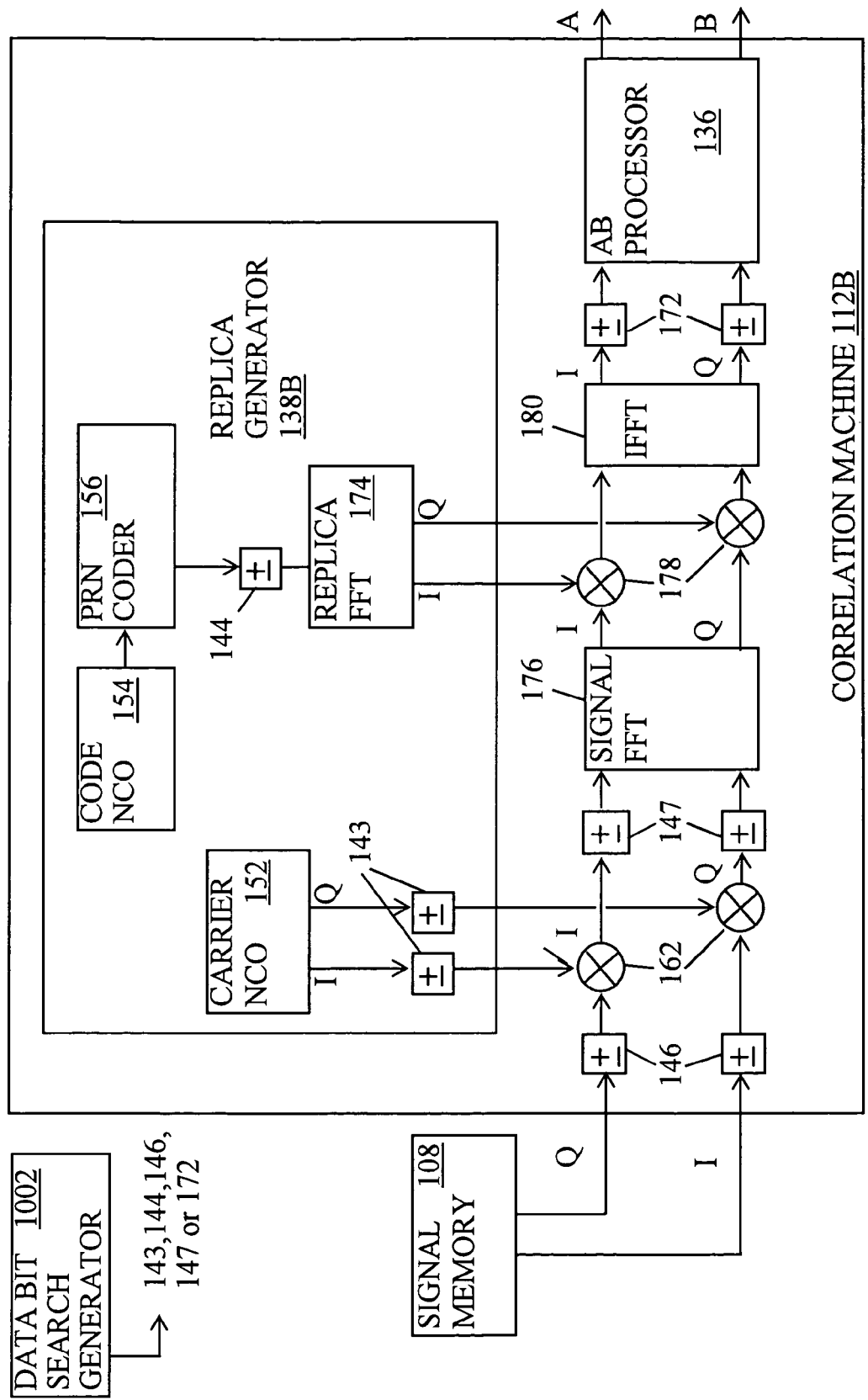
Figure 15:
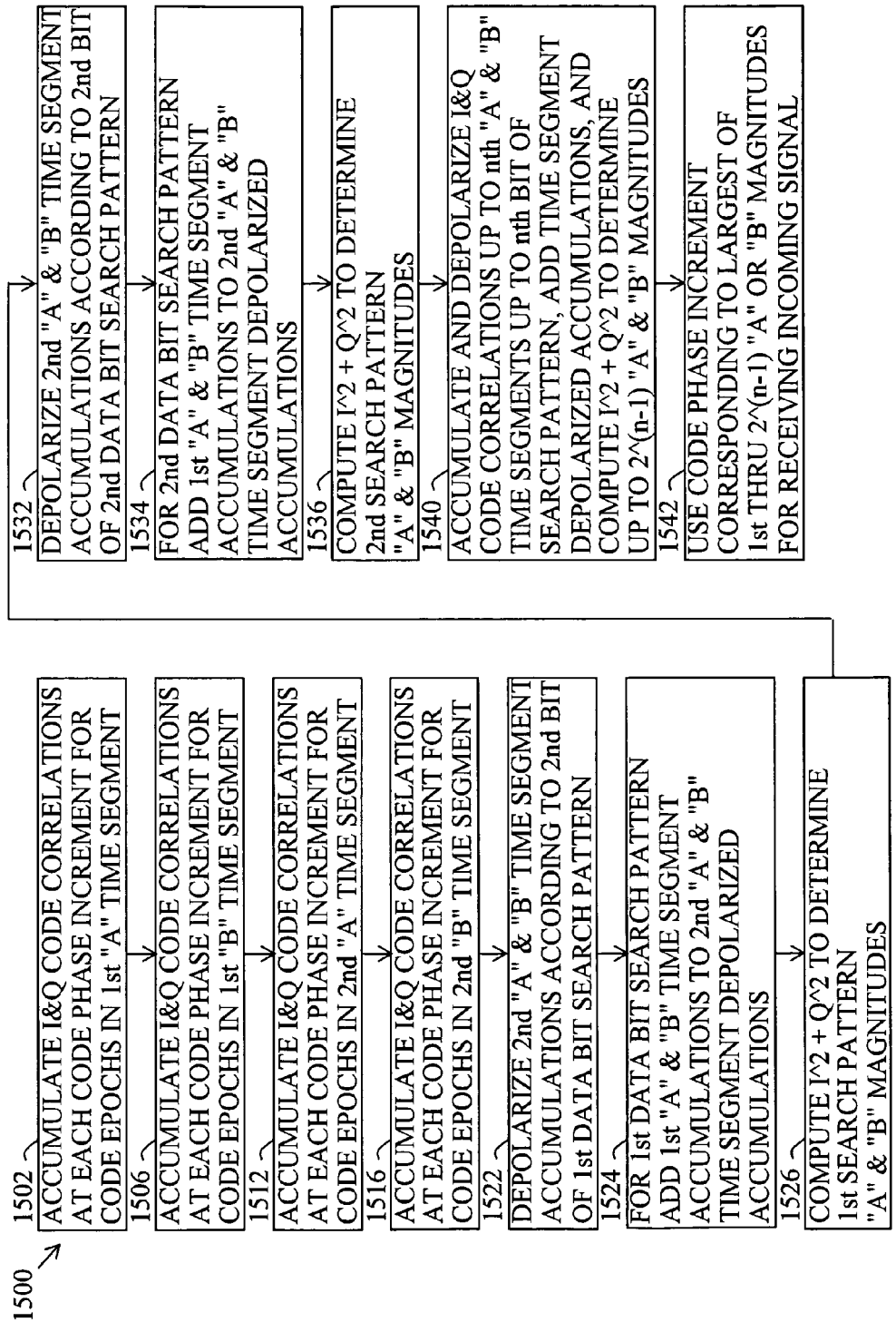

FIGS. 7A-I are flow charts showing embodiments, respectively, having first through ninth arrangements, respectively, for depolarizing, separating, and integrating an incoming signal;

FIG. 8 is a block diagram of an N processor for N types of time periods;

FIG. 9 is a block diagram of a GPS receiver using N types of time periods;

FIG. 10 is a block diagram of a GPS receiver using a data bit search generator with "A" and "B" time periods;

FIGS. 11A and 11B are flow charts of a method for acquiring spread spectrum signals using a data bit search with "A" and "B" time periods;

FIGS. 12A and 12B are time charts showing "A" and "B" time segments and showing accumulated "A" and "B" magnitudes for a correct data bit search pattern for a correct code phase increment for two and three data bit time lengths, respectively;

FIGS. 13 and 14 are block diagram of a time and frequency domain correlation machines with a data bit search generator; and FIG. 15 is a flow chart of a data bit search method.

DETAILED DESCRIPTION

Figure 1A:
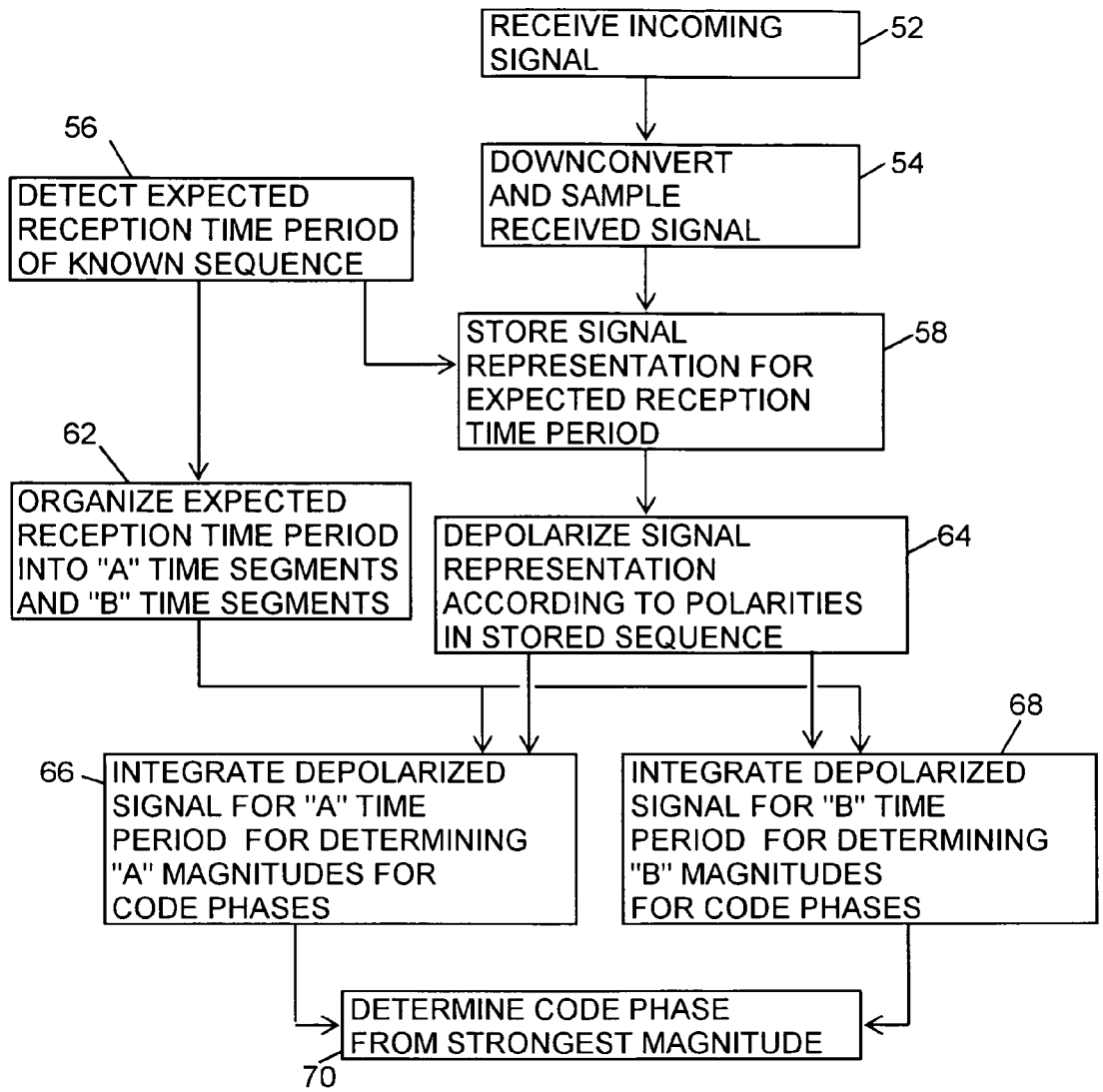
FIGS. 1A and 1B are flow charts of alternative methods for acquiring spread spectrum signals using "A" and "B" time periods.
Figure 1B:
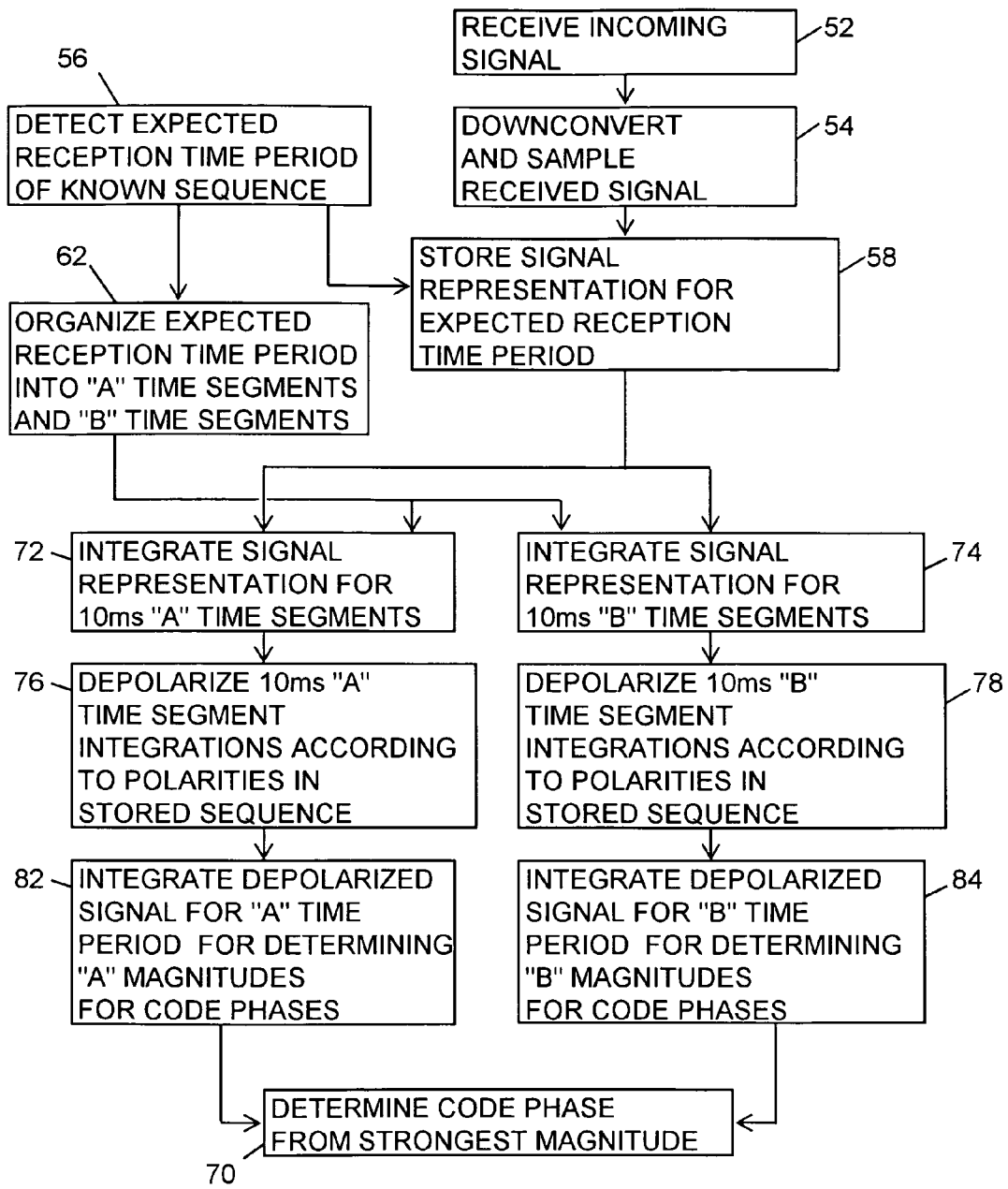

The FIGS. 1A and 1B are flow charts illustrating variations for fast acquisition of weak global positioning system (GPS) signals. At the start, GPS-based time is known beforehand to within one-half the time periods of the GPS data bits; the polarities of a sequence of GPS data bits are known beforehand (stored sequence 122, FIG. 2); and ephemeris information is known or obtained. A method of the present invention is used for acquiring the GPS signal for a first GPS satellite. Then, the method of the present invention or conventional methods may be used for acquiring the GPS signal from other GPS satellites for determining a location fix.

Referring to FIG. 1A, in a step 52 the incoming GPS signal is received. In a step 54 the GPS signal is downconverted. In a step 56 the start of an expected reception time period for an incoming sequence of certain expected GPS data bits is detected. The expected reception time period may be wider than the time period for the incoming sequence in order to accommodate the time delays for differing distances to GPS satellites. In a step 58, the downconverted GPS signal is sampled and a representation of the GPS signal is stored during the expected reception time period. In a step 62 the expected reception time period associated with the stored signal representation is organized into alternating "A" time segments and "B" time segments as shown in FIGS. 6A-E and described in the accompanying detailed descriptions below.

Figure 2:
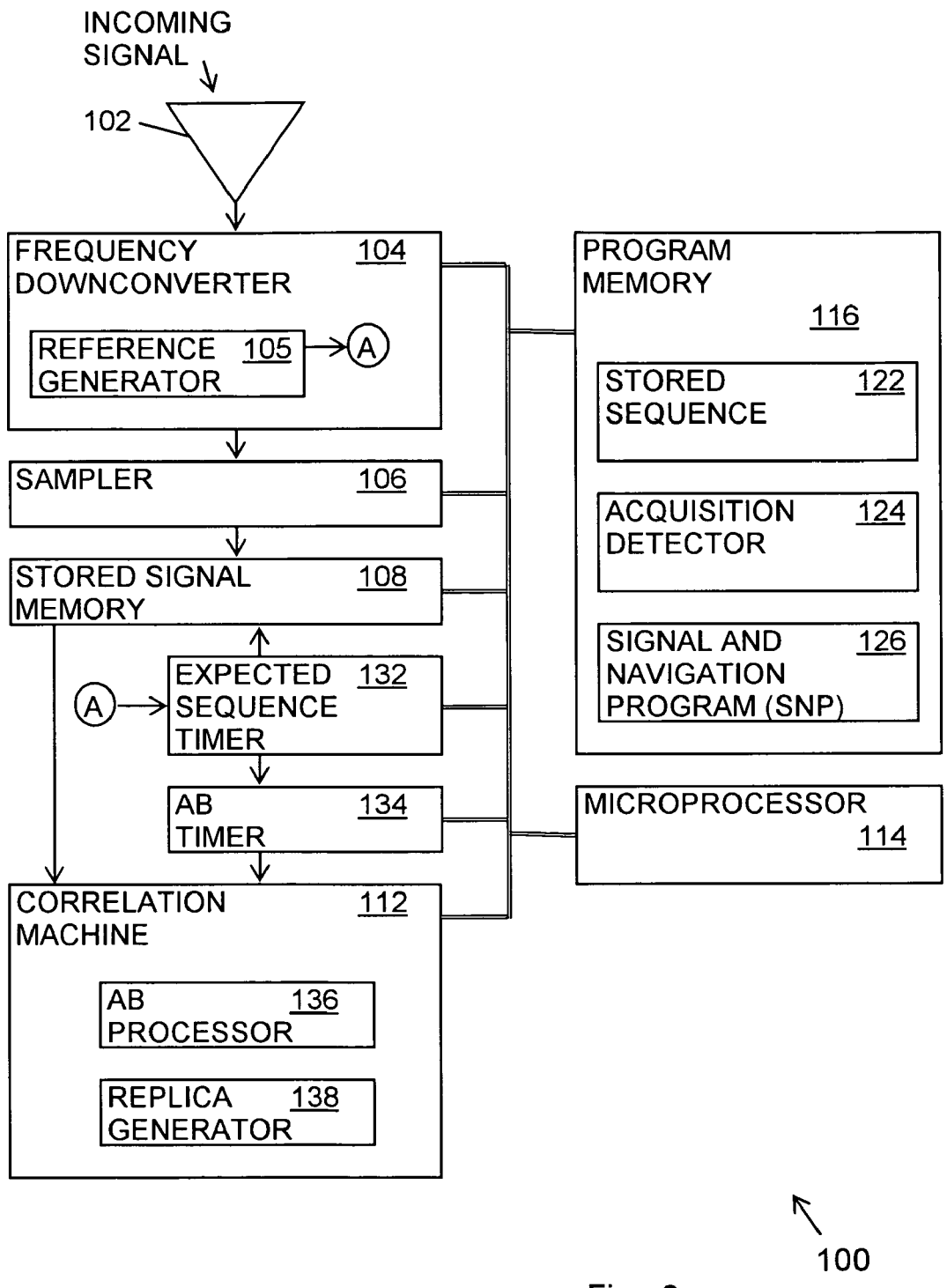
FIG. 2 is a block diagram of a GPS receiver using "A" and "B" time periods.

The stored signal representation is depolarized in a step 64 for the polarities of the stored sequence (122, FIG. 2). In a step 66 an appropriate Doppler frequency is chosen and the depolarized signal representation is integrated (coherently accumulated) for each potential GPS code phase for an "A" time period including all the "A" time segments. Similarly, in a step 68 the depolarized signal representation is integrated (coherently accumulated) using the Doppler frequency for each potential GPS code phase for the "B" time period including all the "B" time segments. The signal integrations for the "A" time period provide "A" time period magnitudes corresponding to the potential code phases, respectively, and the signal integrations for the "B" time period provide "B" time period magnitudes corresponding to the same potential code phases, respectively. Then, in a step 70 the code phase increment that results in the strongest of the "A" time period magnitudes, the "B" time period magnitudes, or combination of the "A": and "B" time period magnitudes at the same code phase increment is tested against a correlation threshold and used for signal acquisition when the correlation threshold is exceeded. In order to find a time period magnitude that exceeds the correlation threshold the steps 66, 68, and 70 may be iterated using different assumptions for carrier frequency.

Referring to FIG. 1B, the steps 52-62 are described above in the detailed description of FIG. 1A. Then, in a step 72 the stored signal representation is integrated for the "A" time segments for providing "A" time segment integrations. Similarly, in a step 74 the stored signal representation is integrated for the "B" time segments for providing "B" time segment integrations.

The "A" time segment integrations are depolarized in a step 76 for the polarities of a stored sequence (122 in FIG. 2) representing the incoming sequence of certain expected GPS data bits for the "A" time segments of the expected reception time period. Similarly, in a step 78 the "B" time segment integrations are depolarized for the polarities of the stored sequence (122 in FIG. 2) for the "B" time segments of the expected reception time period.

The "A" depolarized integrations are integrated (coherently accumulated) in a step 82 for the "A" time period including all the "A" time segments for providing the "A" time period magnitudes. Similarly, in a step 84 the "B" depolarized integrations are integrated (coherently accumulated) for the "B" time period including all the "A" time segments for providing the "B" time period magnitudes. The signal integrations for the "A" time period provide "A" time period magnitudes corresponding to the potential code phases, respectively, and the signal integrations for the "B" time period provide "B" time period magnitudes corresponding to the same potential code phases, respectively. Then, in the step 70 described above, the code phase increment that results in the strongest of the "A" time period magnitudes, the "B" time period magnitudes, or a combination of the "A" and "B" time period magnitudes is tested against a correlation threshold and used for signal acquisition and/or tracking when a correlation threshold is exceeded. In order to find a time period magnitude that exceeds the correlation threshold the steps 72-84 and 70 may be iterated using different assumptions for carrier frequency.

The FIGS. 1A and 1B and the accompanying descriptions illustrate and describe variations in the order of the steps for depolarizing and integrating the representations of the GPS signal. The GPS signal is integrated in one or more steps for the 10 ms "A" and the 10 ms "B" time segments and then the "A" and "B" time segment integrations are integrated (coherently accumulated) for the "A" and "B" time periods. The step of depolarizing may be applied to a representation of the GPS signal before the 10 ms integrations, within stages of the 10 ms integrations of the individual "A" and "B" time segments, to a GPS replica signal used in the 10 ms integrations, or to the "A" and "B" time segments before the 10 ms integrations are integrated (coherently accumulated) for the "A" and "B" time periods. Also, the separation of the processing for the "A" and "B" time segments may be made at any point before or after the depolarization up to the integration of the "A" time segments into the "A" time period and the integration of the "B" time segments into the "B" time period.

FIG. 2 is a block diagram of a signal receiver referred to by a general reference number 100. The receiver 100 is described in terms of a global positioning system (GPS) receiver for receiving incoming coarse/acquisition (C/A) GPS signals. However, those of ordinary skill the art of spread spectrum radio receivers will see that the block diagram illustrated in FIG. 2 and described below can be applied for receiving other types of signals, especially for receiving other types of direct fast sequence spread spectrum signals including precision P or P(Y) code GPS signals.

The GPS receiver 100 includes a GPS antenna 102, a frequency downconverter 104, a sampler 106, a stored signal memory 108, a correlation machine 112, a microprocessor 114, and a program memory 116. The GPS antenna 102 converts incoming airwave GPS signals from GPS satellites or pseudolites to conducted GPS signals and passes the conducted GPS signals to the frequency downconverter 104. The frequency downconverter 104 includes a reference generator 105, local oscillators deriving their frequencies from the reference generator 105, and mixers for downconverting the GPS signals to a lower frequency and passing the lower frequency GPS signals to the sampler 106. The sampler 106 samples the downconverted GPS signals for providing in-phase (I) and quadrature phase (Q) samples. The signal memory 108 stores the I and Q samples for a selected time period as a stored signal representation for later use by the correlation machine 112. In an alternative embodiment the correlation machine 112 processes a representation of the incoming signal in real time as it arrives.

The correlation machine 112 integrates the signal representation for providing correlation magnitudes corresponding to code phases, respectively, of the pseudorandom noise (PRN) spreading code in the GPS signal. Typically, the correlation machine 112 has several independent channels where each channel processes the stored signal representation the GPS signal for one GPS satellite at a time. For example, a 12 channel correlation machine 112 could be aligned for acquiring and/or tracking GPS signals from 12 GPS satellites, respectively, or each channel of the correlation machine 112 could be aligned for sharing the task of acquiring and/or tracking the GPS signal from one GPS satellite or several channels could be aligned for acquiring the GPS signal from several GPS satellites while several channels are aligned for acquiring and/or tracking the GPS signal from one GPS satellite. The expected reception time period for the stored signal representation for each GPS satellite is offset in time several milliseconds depending upon the location of the GPS satellite transmitting the signal.

The microprocessor 114 reads programmed instructions in the program memory 116 for controlling the elements of the GPS receiver 100. The program memory 116 includes a stored sequence 122, an acquisition detector 124, and a signal and navigation program 126. The stored sequence 122 includes data for known polarities of certain expected GPS data bits having respective expected reception times. In an embodiment, the stored sequence 122 includes expected GPS data bits forming a continuous sequence for a continuous expected reception time period. However, the stored sequence 122 can be any two GPS data bits, either contiguous or separated, having known polarities and expected reception times. The acquisition detector 124 includes instructions for using the correlation magnitudes from the correlation machine 112 for determining the code phase of the PRN spreading code to use for GPS signal acquisition. The signal and navigation program 126 includes instructions for directing the microprocessor 114 for signal acquisition, signal tracking, location and time fixes, and control for the functions of the GPS receiver 100.

The GPS receiver 100 also includes an expected sequence timer 132, and an AB timer 134. The sequence timer 132 uses the reference generator 105 for maintaining GPS time to within ±10 ms for gating the sampler 106 and/or the signal memory 108 for storing the sampled downconverted GPS signal during the expected reception time period. There are several ways in which GPS time can be maintained to within ±10 ms. For relatively short periods of time, for example a few hours to a few days, an accurate GPS-based time can be maintained with an accurate temperature controlled clock. For longer periods of time, an accurate GPS-time can be received in a time signal transmitted from a time source. The sequence timer 132 also triggers the AB timer 134 for generating AB time segment signals for organizing the expected reception time period into alternating 10 ms "A" time segments and 10 ms "B" time segments as illustrated in FIGS. 6A-E and described in the accompanying detailed description below. Typically, the "A" and "B" time segments for one GPS satellite are offset in time from the "A" and "B" time segments for another GPS satellite in order to accommodate different distances to the satellites.

The correlation machine 112 includes an AB processor 136. The AB processor 136 provides "A" time period magnitudes for an "A" time period having accumulated integrations for the "A" time segments (and "A" augmentation time segments described below) and provides "B" time period magnitudes for a "B" time period having accumulated integrations for the "B" time segments (and "B" augmentation time segments described below). The correlation machine 112 including the AB processor 136 integrates the stored signal representation of the GPS signal during the "A" time period for providing an "A" time period magnitude for each potential GPS code phase and during the "B" time period for providing a "B" time period magnitude for each potential GPS code phase.

A replica generator 138 preferably included in the correlation machine 112 generates GPS replica signals for the carrier frequency and the spreading code of the GPS signals as represented by the stored signal representation of the GPS signals. The C/A code of the GPS signal has a 1023 bit or chip spreading code. The replica generator 138 issues a replica signal for all 1023 chips either in the time or frequency domain for both I and Q in one-half chip or smaller increments of code phase. The correlation machine 112 in an embodiment provides I and Q correlation levels in increments that are slightly less than one-half chip. Preferably about 2048 code phase increments are provided for I and about 2048 code phase increments are provided for Q to the AB processor 136. During the "A" time period, the AB processor 136 accumulates and combines the I and Q levels for providing the "A" time period magnitudes; and during the "B" time period, the AB processor 136 accumulates and combines the I and Q levels for providing the "B" time period magnitudes. The correlation machine 112 and integration process are illustrated and described in greater detail in FIGS. 3-4 and the accompanying descriptions below.

The "A" time period magnitudes and the "B" time period magnitudes from the correlation machine 112 are processed by the microprocessor 114 using instructions in the acquisition detector 124 for determining the increment of code phase for the replica code that appears to match the code phase of the incoming GPS signal. This replica code phase is then processed for GPS signal acquisition by the microprocessor 114 according to instructions in the signal and navigation program 126.

There are several embodiments for the acquisition detector 124 that can process the "A" and "B" time period magnitudes in order to find the code phase for acquisition. In an embodiment, the strongest of the time period magnitudes, whether one of the "A" time period magnitudes or the "B" time period magnitudes, is tested against a correlation threshold. In another embodiment, the "A" time period magnitude and the "B" time period magnitude for a code phase are combined (incoherently) or their squares are added to form an AB time period magnitude for that code phase. When the strongest combined time period magnitude exceeds the correlation threshold, the code phase that resulted in that combined time period magnitude is used for signal acquisition and tracking. Once the code phase for acquisition of the GPS signal from a single GPS satellite is determined, conventional methods can be used for acquiring the GPS signal from other GPS satellites. When the strongest magnitude does not exceed the required correlation threshold, then a different Doppler frequency, a different PRN code, a different GPS time, or the like is tried and the process is repeated; or the GPS receiver 100 may go into a standby mode to conserve power.

The stored sequence 122 may be a fixed sequence stored in the program memory 116. However, typically the stored sequence 122 is calculated depending upon recent information and then stored in the program memory 116 after calculation. One sequence of GPS data bits that can be used for the stored sequence 122 is the time-of-week (TOW) in the handover-word (HOW) that is broadcast in each subframe of the GPS signal. The TOW is the 17 most significant bits (MSB)s corresponding to a TOW-count at the epoch which occurs at the leading edge of the next following subframe. The polarities of this sequence of 17 bits are known by knowing the GPS-based time which is maintained by the GPS receiver 100 to within ±10 ms for use by the expected sequence timer 132. The 17 bits of the TOW result in a total expected reception time period of about 340 ms. Extra time may be required time error or to account for early and late edges times. Those skilled in the art will be able to determine other sequences within the GPS subframes that can be used. A more complete understanding of the HOW and TOW and other sequences within the GPS signal is available in published form from Navtech Seminars & Navtech Bookstore and Software Store, of Arlington, Va., under title of GPS Interface Control Document ICD-GPS-200 which is incorporated herein by reference.

The expected GPS data bits do not need to be continuous or consecutive. For non-consecutive data bits, the sequence timer 132 provides triggers to the AB timer 134 for the expected reception time period for each section of the stored sequence 122. However, it should be understood that a wider separation between the beginning of the first time segment and the end of the last time segment results in a narrower carrier frequency range of the GPS signal for the correlation process. When the carrier frequency range is narrow, the integration process may need to be iterated for many carrier center frequencies before a satisfactory code phase is found for signal acquisition. Preferably, the reference generator 105 generates a reference signal having a stable frequency and a capability of being updated or stabilized further with a frequency standard signal transmitted from a frequency standard source.

Using more than two types for sequential 10 ms time segments reduces the requirement for accurate time but also reduces the signal processing gain. Doubling the number of types of time segments halves the time accuracy requirement. For example, four types of alternating 10 ms time segments ("A" then "B" then "C" then "D" then "A" again and so on) could be used for reducing the time accuracy requirement to ±20 ms but also reduces the total time for any one of the "A", "B", "C", and "D" time periods by a factor of two, thereby reducing the signal processing gain. A time chart illustrating "A", "B", "C", and "D" alternating time segments is shown in FIG. 6F and described in the accompanying detailed description.

Figure 3:
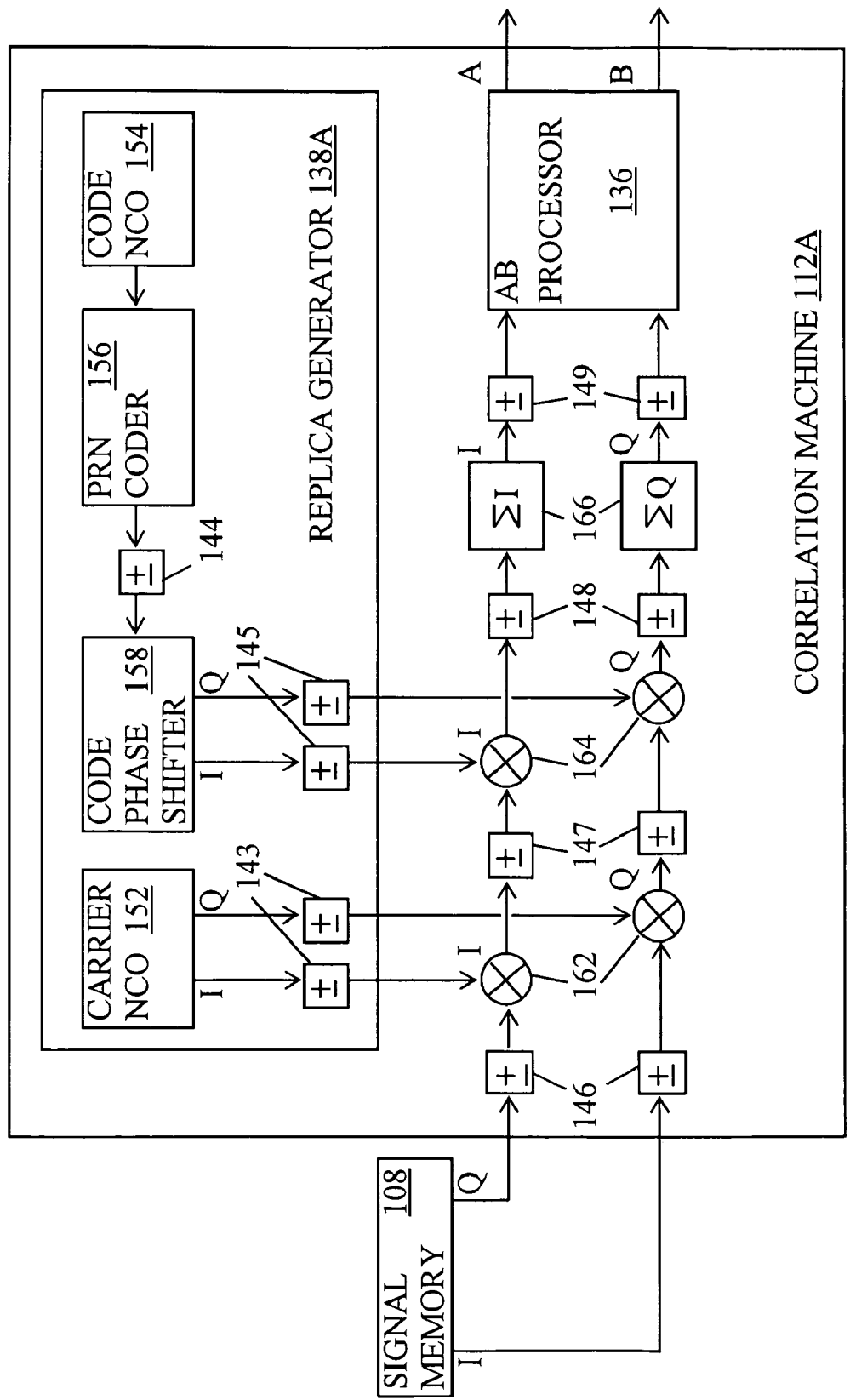
FIG. 3 is a block diagram of a time domain correlation machine for a GPS receiver.

FIG. 3 is a block diagram showing the signal memory 108 and a time domain correlation machine 112A that is an embodiment of the correlation machine 112 described above. The block diagram of the correlation machine 112A shows depolarizers 143-149 in optional placements within the correlation machine 112A. One of the depolarizers 143-149 depolarizes a representation of the GPS signal by inverting the GPS signal representation for one polarity for a GPS data bit in the stored sequence 122 and not inverting the GPS signal representation for the other polarity. Only one of the depolarizers 143-149 at only one of the placements is used in any one embodiment.

The block diagram of the correlation machine 112A illustrates a single channel for determining "A" and "B" time period magnitudes for respective code phases. However, an embodiment of the GPS receiver 100 will include several such channels in the correlation machine 112A where each channel operates effectively in parallel.

The correlation machine 112A includes a replica generator 138A that is a version of the replica generator 138 described above. The replica generator 138A includes a carrier numerically controlled oscillator (NCO) 152, a code numerically controlled oscillator (NCO) 154, a pseudorandom (PRN) coder 156, and a code phase shifter 158. The carrier NCO 152, code NCO 154, PRN coder 156, and code phase shifter 158 are controlled by the microprocessor 114. The carrier NCO 154 issues I and Q replica carrier signals for the expected carrier frequency of the downconverted GPS signal. The code NCO 154 issues a code rate signal for the expected code rate of the GPS signal to the PRN coder 156. The PRN coder 156 generates a selected PRN code at the repetition rate of the code rate signal. The selected PRN code may be selected to be different or the same for each of the channels of the correlation machine 112A depending upon the status of the GPS receiver 100. The code phase shifter 158 issues I and Q replica versions of the PRN code in sample increments of code phase of preferably one-half chip at a controlled code phase. In order to determine the correct code phase for signal acquisition, the code phase shifter 158 shifts the PRN code in shift increments of code phase that are one-half chip or smaller, preferably one-half chip. Alternatively, the code phase shifter 158 is not required if the PRN coder 156 issues I and Q replica code signals for incremental code phase shifts in parallel.

The correlator machine 112A also includes I and Q carrier multipliers 162, and I and Q code multipliers 164. Although only one set of carrier multipliers 162 and one set of code multipliers 164 are shown, several sets may be included for faster parallel processing. Multiple code multipliers 164 are required where the replica code signal includes the code phase shifts in parallel. The correlation machine 112A also includes I and Q accumulators 166 and the AB processor 136

(or an N processor 800, FIGS. 8-9). The processing of the I samples from the signal memory 108 will now be described with the understanding that the Q samples are processed in the same way. The I carrier multiplier 162 correlates I samples from the signal memory 108 with the I samples of the replica carrier signal from the carrier NCO 152 for providing an I baseband (or pseudo-band) representation of the GPS signal. The I code multiplier 164 correlates the I baseband signal with the I replica PRN code from the code phase shifter 158 for providing I code correlations to the I accumulator 166 for each increment of code phase at the current increment of replica code phase shift.

The I accumulator 166 despreads the GPS signal by accumulating (integrating) the I code correlations for the current increment of replica code phase shift for a selected time period, preferably either one complete code time period at 1 ms for ten times or ten complete code periods at 10 ms for one time. For the example of slightly less than one-half chip incremental code phase shift for the 1023 chip C/A PRN code, for either 1 ms or 10 ms correlation time periods, the I accumulator provides preferably about 2048 I integrations. The accumulated I integrations are then passed to the AB processor 136 (or an N processor 800, FIGS. 8-9). The same process is followed for the Q GPS signal representations for providing accumulated Q integrations to the AB processor 136 (or N processor 800, FIGS. 8-9).

The depolarized replica signal is used within the correlation machine 112A for depolarizing a representation of the incoming signal. The placement of the depolarizer 143 shows an optional placement for depolarizing the I and Q replica carrier signal from the carrier NCO 152 for providing a depolarized replica signal. The placement of the depolarizer 144 shows an optional placement for depolarizing the PRN code from the PRN coder 156 for providing a depolarized replica signal. The placement of the depolarizer 145 shows an optional placement for depolarizing the I and Q PRN codes from the code phase shifter 158 for providing a depolarized replica signal. The placement of the depolarizer 146 shows an optional placement for depolarizing the I and Q stored signal representation from the signal memory 108. The placement of the depolarizer 147 shows an optional placement for depolarizing the I and Q baseband GPS signal from the carrier multipliers 162. The placement of the depolarizer 148 shows an optional placement for depolarizing the I and Q correlations from the code multipliers 164. The placement of the depolarizer 149 shows an optional placement for depolarizing the I and Q integrations from the accumulator 168.

Figure 4:
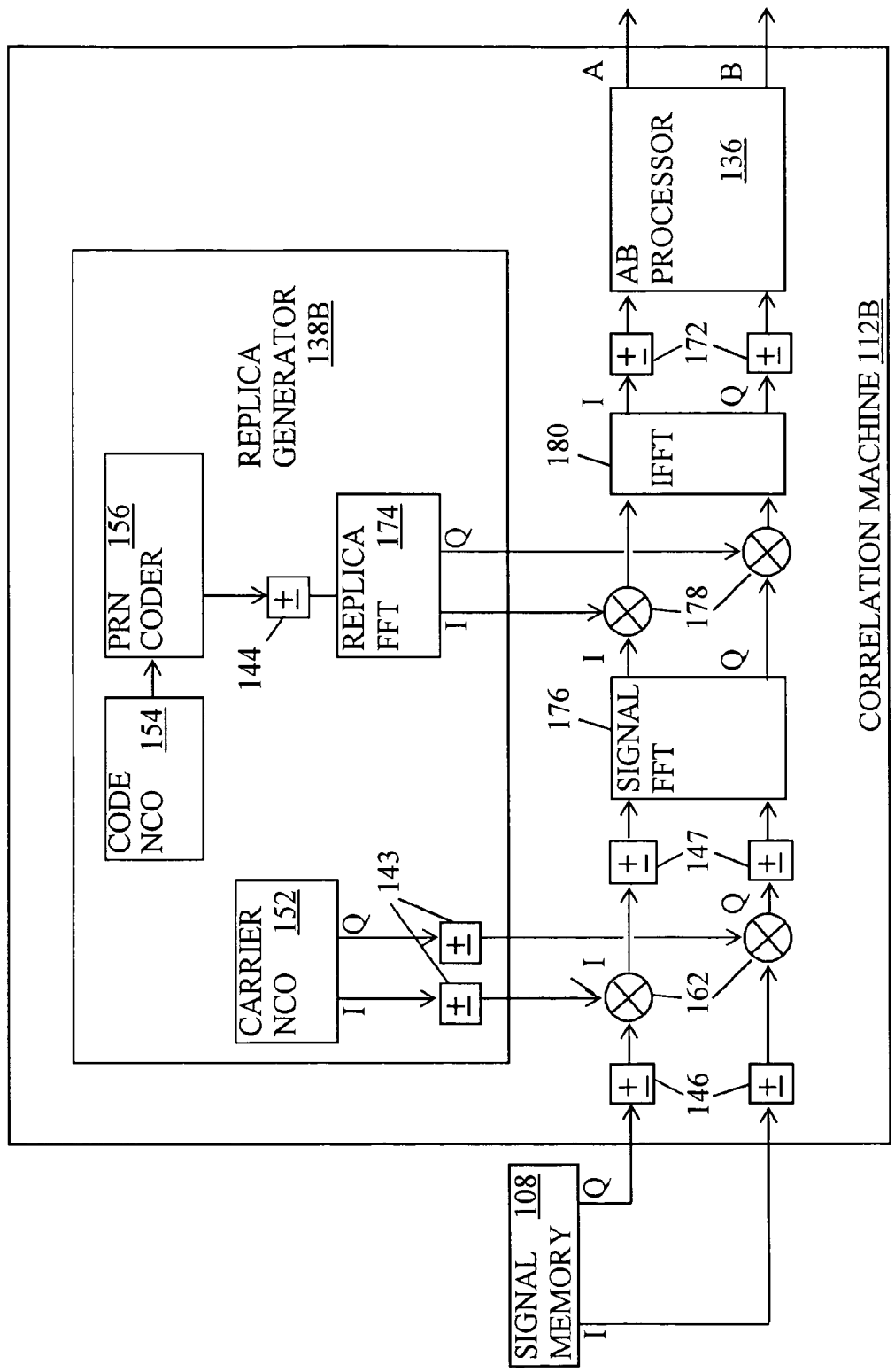
FIG. 4 is a block diagram.

FIG. 4 is a block diagram showing the signal memory 108 and a frequency domain correlation machine 112B that is an embodiment of the correlation machine 112 described above. The block diagram of the correlation machine 112B shows the depolarizers 143-144 and 146-147 described above, and a depolarizer 172 in optional placements within the correlation machine 112B. One of the depolarizers 143-144, 146-147, or 172 depolarizes a representation of the GPS signal by inverting the GPS signal representation for one polarity for a GPS data bit in the stored sequence 122 and not inverting the GPS signal representation for the other polarity. Only one of the depolarizers 143-144, 146-147, and 172 at only one of the placements is used in any one embodiment.

The block diagram of the correlation machine 112B illustrates a single channel for determining "A" and "B" time period magnitudes for respective code phases. However, an embodiment of the GPS receiver 100 will include several such channels in the correlation machine 112B where each channel operates effectively in parallel.

The correlation machine 112B includes a replica generator 138B that is a version of the replica generator 138 described above. The replica generator 138B includes the carrier NCO 152, the code NCO 154, and the PRN coder 156 as described above, and a replica fast Fourier transformer 174. The replica fast Fourier transformer (FFT) 178 performs a complex fast frequency transform on the PRN code from the PRN coder 156 for providing frequency domain I and Q replica code signals corresponding to increments of code phase of preferably one-half chip.

The correlator machine 112B also includes the I and Q carrier multipliers 162 described above, a signal fast Fourier transformer (FFT) 176, I and Q code multipliers 178, an inverse fast Fourier transformer (IFFT) 180, and the AB processor 136 (or N processor 800, FIGS. 8-9). The signal FFT 176 performs a complex fast Fourier transform on the I and Q baseband signals from the I and Q carrier multipliers 162 for providing frequency domain I and Q baseband signals. The I code multiplier 178 multiplies the frequency domain I baseband signal by the frequency domain I replica code signal for providing a frequency domain I despread GPS signal to the IFFT 180. Similarly, the Q code multiplier 178 multiplies the frequency domain Q baseband signal by the frequency domain Q replica code signal for providing a frequency domain Q despread GPS signal to the IFFT 180. The IFFT 180 performs a complex inverse fast Fourier transform on the frequency domain I and Q despread GPS signals for providing I and Q correlation levels for all potential code phase increments in parallel for a selected time period of preferably 10 ms. For an example of slightly less than one-half chip increments of replica code, for the 1023 chip C/A PRN code, the IFFT 180 preferably provides about 2048 I integrations and about 2048 Q integrations. The I and Q correlation levels are then passed to the AB processor 136 (or N processor 800, FIGS. 8-9).

The placement of the depolarizer 172 shows an optional placement for depolarizing the I and Q integrations after the IFFT 180. The depolarizers 143-144 and 146-147 are optionally placed within the correlation machine 112B as described above in the detailed description accompanying FIG. 3 for the correlation machine 112A.

Figure 5:
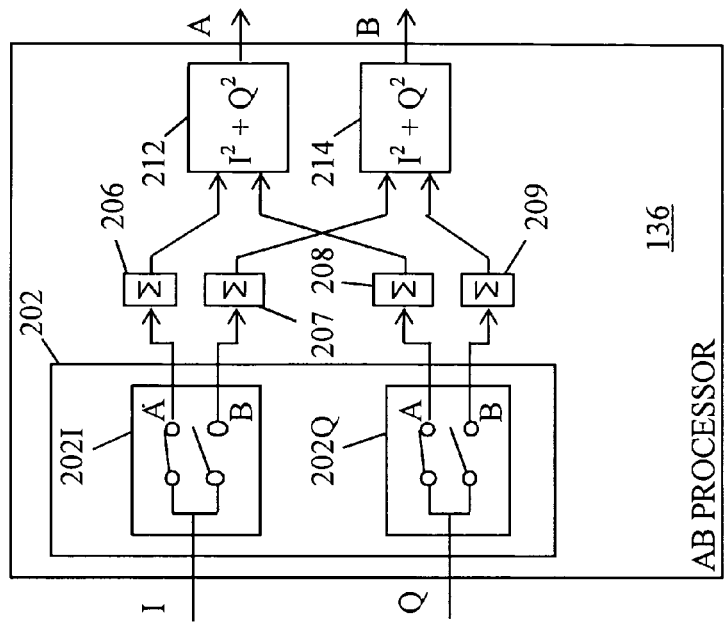
FIG. 5 is a block diagram of an AB processor for the correlation machines of FIGS. 3 and 4.

FIG. 5 is a block diagram of the AB processor 136 for receiving I and Q integrations from the I and Q accumulators 166 of the time domain correlation machine 112A or the IFFT 180 of the frequency domain correlation machine 112B. One of the depolarizers 143-149 or 172 is in place so that the I and Q integrations are depolarized according to the polarities in the stored sequence 122.

The AB processor 136 includes an AB switch 202, accumulators 206-209, an "A" combiner 212, and a "B" combiner 214. The AB switch 202 separates a representation of the incoming signal into the "A" time period and the "B" time period. The "A" time period includes "A" time segments and "A" augmentation time segments (FIG. 6A-E). The "B" time period includes "B" time segments and "B" augmentation time segments (FIG. 6A-E). There are several variations (FIGS. 7A-I) regarding the placement of the AB switch 202 within the GPS receiver 100 for separating the incoming signal according to the "A" and "B" time periods. In one variation the AB switch 202 separates the stored signal representation where the stored signal representation enters the correlation machine 112 from the signal memory 108. In this variation the correlation machine 112 integrates the stored signal representation for the "A" time period separately from the stored signal representation for the "B" time period. In another variation the AB switch 202 is disposed within the correlation machine 112 so that signal can be processed in time periods of up to the 10 ms time periods of the "A" and "B" time segments before the AB switch 202.

In an embodiment, the AB switch 202 includes an I AB switch 202I and a Q AB switch 202Q. The I AB switch 202I receives the depolarized I integrations from the I accumulator 166 for the time domain correlation machine 112A or the IFFT 180 for the frequency domain correlation machine 112B. Similarly, the Q AB switch 202Q receives the depolarized Q integrations from the Q accumulator 166 for the time domain correlation machine 112A or the IFFT 180 for the frequency domain correlation machine 112B. In FIG. 5, the I AB switch 202I and the Q AB switch 202Q are shown for the "A" time period.

For the "A" time period, the I AB switch 202I passes the depolarized I integrations to the accumulator 206. For the "B" time period, the I AB switch 202I passes the depolarized I integrations to the accumulator 207. The accumulator 206 accumulates the depolarized I integrations for the "A" time period for providing an "A" I magnitude accumulation for each code phase. The accumulator 207 accumulates the depolarized I integrations for the "B" time period for providing a "B" I magnitude accumulation for each code phase.

The Q AB switch 202Q for the "A" time period passes the depolarized Q integrations to the accumulator 208. For the "B" time period the Q AB switch 202Q passes the depolarized Q integrations to the accumulator 209. The accumulator 208 accumulates the depolarized Q integrations for the "A" time period for providing an "A" Q magnitude accumulation for each code phase. The accumulator 209 accumulates the depolarized Q integrations for the "B" time period for providing a "B" Q magnitude accumulation for each code phase.

The A combiner 212 adds the square of the "A" I magnitude accumulation from the accumulator 206 to the square of the "A" Q magnitude accumulation from the accumulator 208 for each code phase increment for providing the "A" time period magnitudes. The B combiner 214 adds the square of the "B" I magnitude accumulation from the accumulator 207 to the square of the "B" Q magnitude accumulation from the accumulator 209 for each code phase increment for providing the "B" time period magnitudes. At this point for code phase increments of slightly less than one-half chip there will be preferably about 2048 "A" time period magnitudes and about 2048 "B" time period magnitudes. As described above, the code phase increment that results in the strongest of the "A" time period magnitudes, the "B" time period magnitudes, or combination of the "A" and "B" time period magnitudes is tested against a correlation threshold and used for signal acquisition when the correlation threshold is exceeded.

As described above the "A" I and Q magnitude accumulations and "B" I and Q magnitude accumulations are preferably linear functions proportional to the levels for the I and Q integrations of the GPS signal, whereas the "A" and "B" time period magnitudes are preferably proportional to the sum of the squares the I and Q magnitude accumulations ($I^2+Q^2$). However, it should be noted that the "A" and "B" time period magnitudes can be some other convenient non-decreasing function of the "A" and "B" I and Q magnitude accumulations, such as the sum (I+Q) or square root of the sum of the squares ($\sqrt{I^2+Q^2}$).

The "A" and "B" time segments can be processed separately through the correlation machines 112A and 112B. In a variation of the correlation machine 112A, the I carrier multiplier 162, the I code multiplier 164, and the I accumulator 166 integrate representations of the GPS signal for "A" time segments and separately for "B" time segments for providing depolarized I integrations for "A" time segments and depolarized I integrations for "B" time segments, respectively, and likewise for Q. The AB processor 136 then uses the accumulators 206-209 and the combiners 212 and 214 as described above. Similarly, for the correlation machine 112B, the carrier multipliers 162, the signal FFT 176, the code multipliers 178, and the IFFT 180 integrate representations of the GPS signal for "A" time segments and separately for "B" time segments for providing depolarized I integrations for "A" time segments and depolarized I integrations for "B" time segments, respectively, and likewise for Q.

Figure 6A:
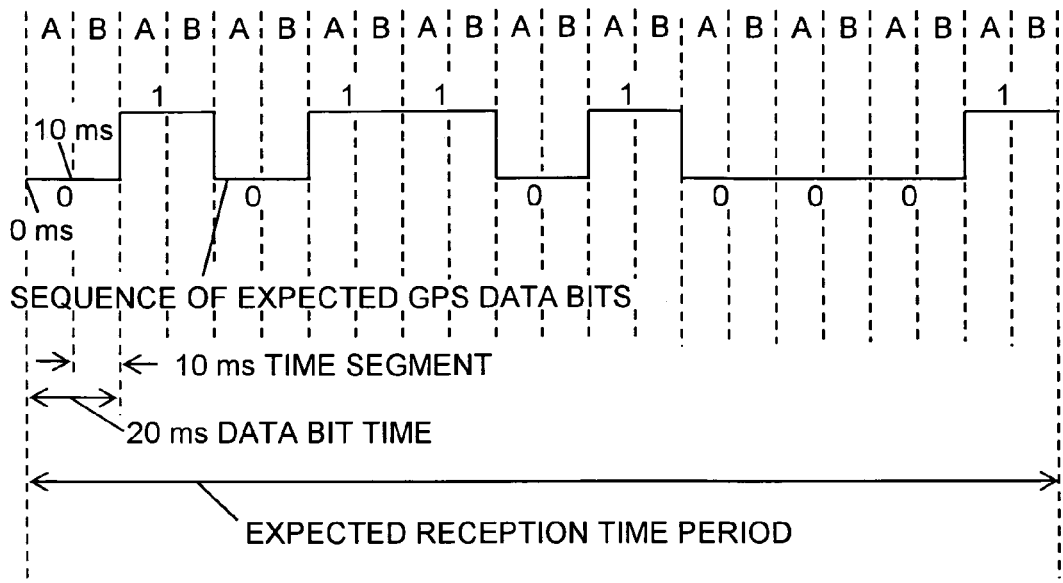
FIGS. 6A and 6B are time charts showing "A" and "B" time segments for a continuous expected reception time period and a discontinuous expected reception time period, respectively.
Figure 6B:
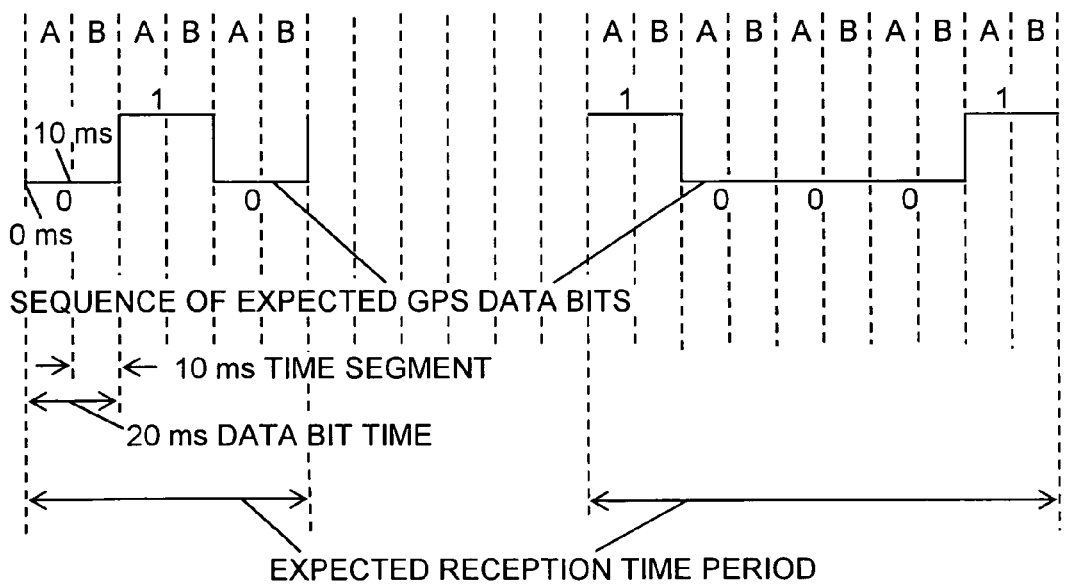

FIGS. 6A-B illustrate the "A" and "B" time segments with respect to exemplary sequences of GPS data bits. Each of the "A" time segments and each of the "B" time segments is preferably about one-half the time length of a data bit. For the exemplary case of C/A GPS, the data bits have a time period of 20 ms, thereby the "A" and "B" time segments preferably have periods of about 10 ms. The "A" time segments start at the start of expected reception time period of the first bit of a known sequence of expected GPS data bits (t=0 ms) for a case where GPS-based time is accurate to within a small portion of a millisecond within the GPS receiver 100. The "A" time segments and then repeat each 20 ms thereafter for the expected reception time period. The "B" time segments start 10 ms later (t=10 ms) and repeat 20 ms thereafter for the expected reception time period in order to alternate with the "A" time segments. FIG. 6A shows the expected reception time period for a continuous sequence of expected GPS data bits. FIG. 6B shows the expected reception time period for a discontinuous sequence of expected GPS data bits. The "A" time period includes only those "A" time segments for the expected GPS data bits while leaving a gap for the time period between the expected GPS data bits and likewise the "B" time period includes only those "B" time segments for the expected GPS data bits while leaving a gap for the time period between the expected GPS data bits.

Figure 6C:
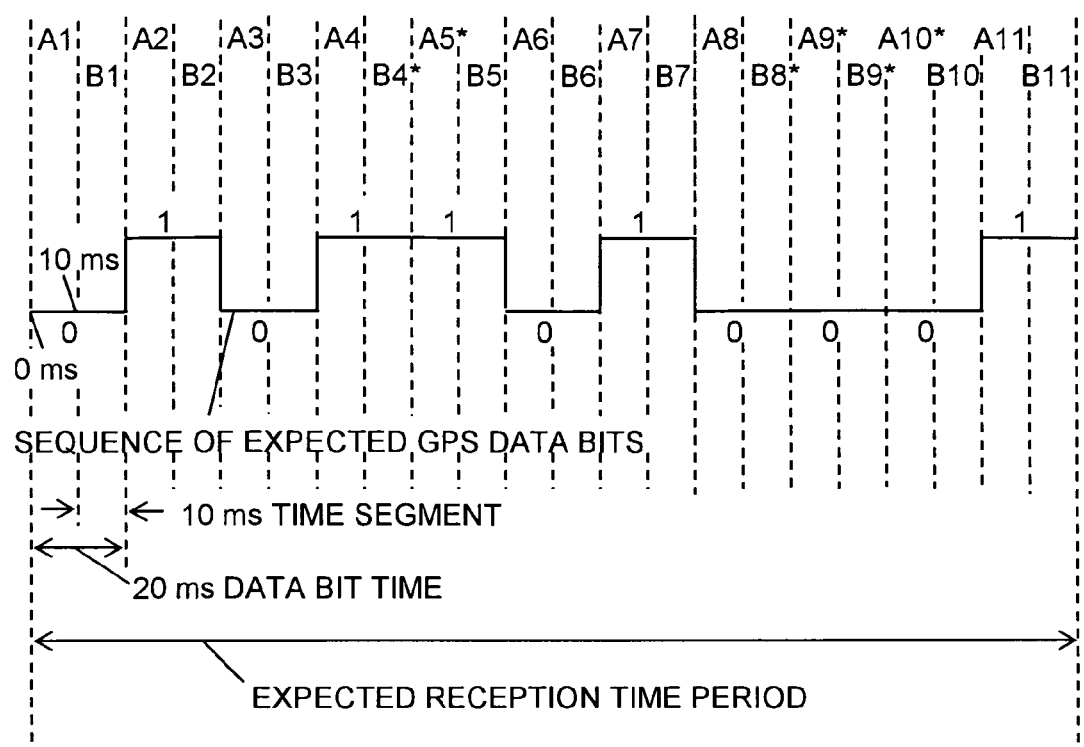
FIG. 6C is a time chart showing "A" and "B" augmentation time segments.

FIG. 6C shows the "A" and "B" time segments numbered A1-11 and B1-11, respectively, in positions with respect to the sequence of expected data bits for a locally maintained GPS-based time that is exactly accurate. For an error in the GPS-based time of up to plus or minus 10 ms, it can be seen that the B4, the B8, and the B9 time segments denoted with asterisks (*), termed herein "A" augmentation time segments, correspond to the same polarity in the sequence as they have for the exactly correct time. Accordingly, in order to increase processing gain of the "A" time period magnitudes, the "A" time period can be constructed to include not only the A1-A11 time segments but also the "A" augmentation time segments B4*, B8*, and B9*. Similarly, for an error in the GPS-based time of up to plus or minus 10 ms, it can be seen that the A5, the A9, and the A10 time segments denoted with asterisks (*), termed herein "B" augmentation time segments, correspond to the same polarity in the sequence as they have for the exactly correct time. Accordingly, in order to increase processing gain of the "B" time period magnitudes, the "B" time period can be constructed to include not only the B1-B11 time segments but also the "B" augmentation time segments A5*, A9*, and A10*.

Figure 6D:
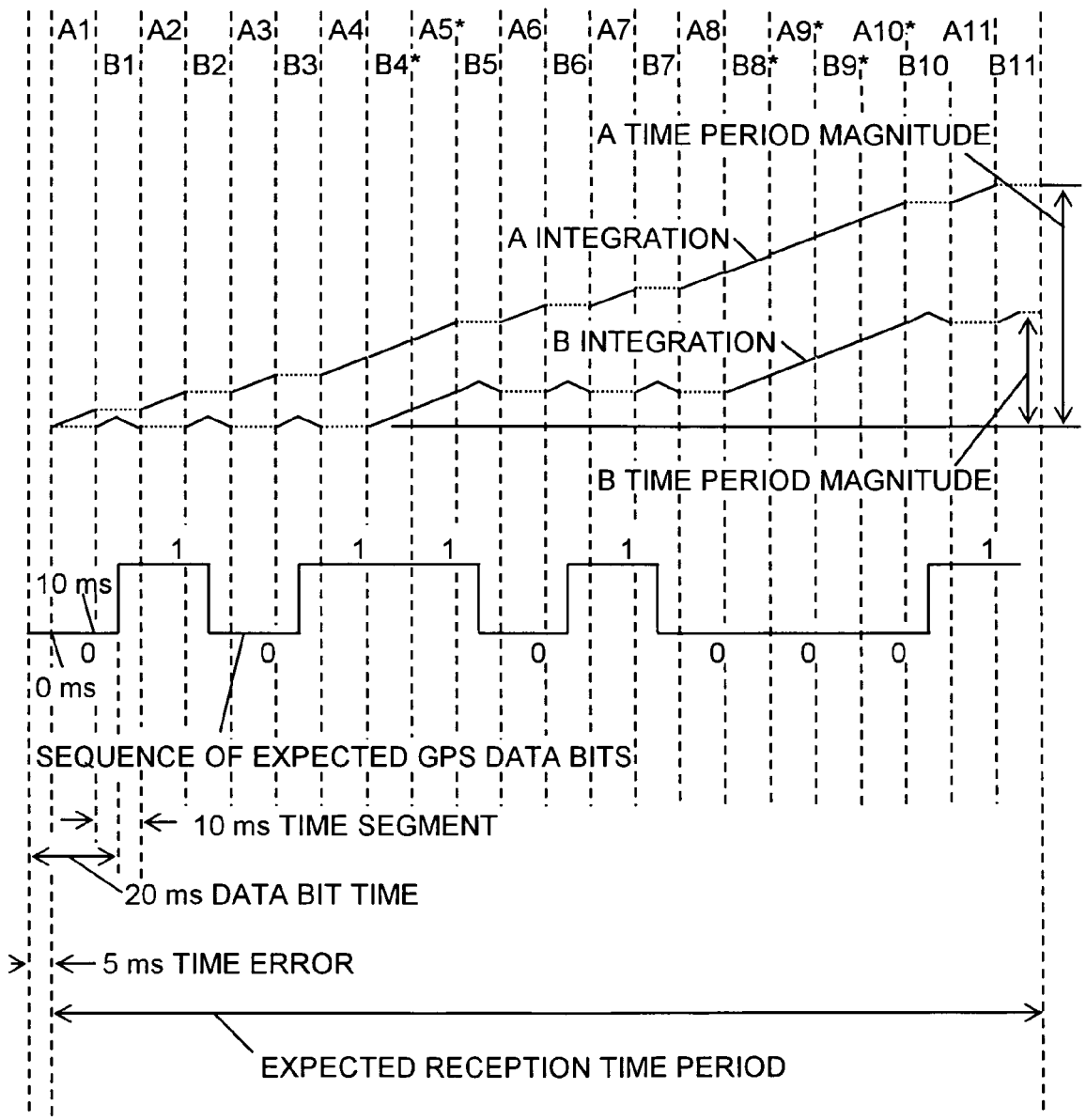
FIGS. 6D and 6E are time charts for time errors of 5 and 10 milliseconds, respectively, showing "A" and "B" time period magnitudes.
Figure 6E:
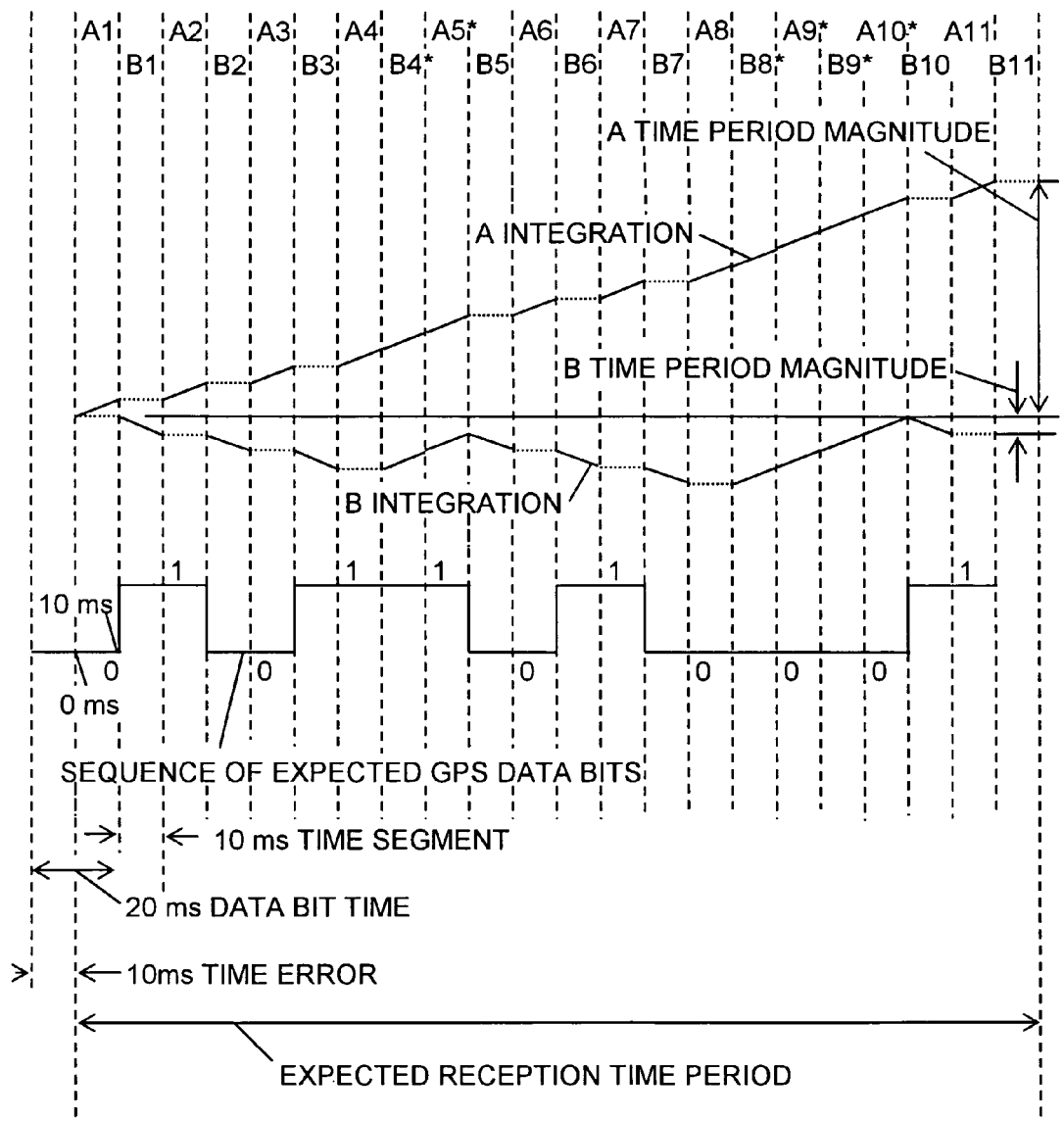
Figure 6F:
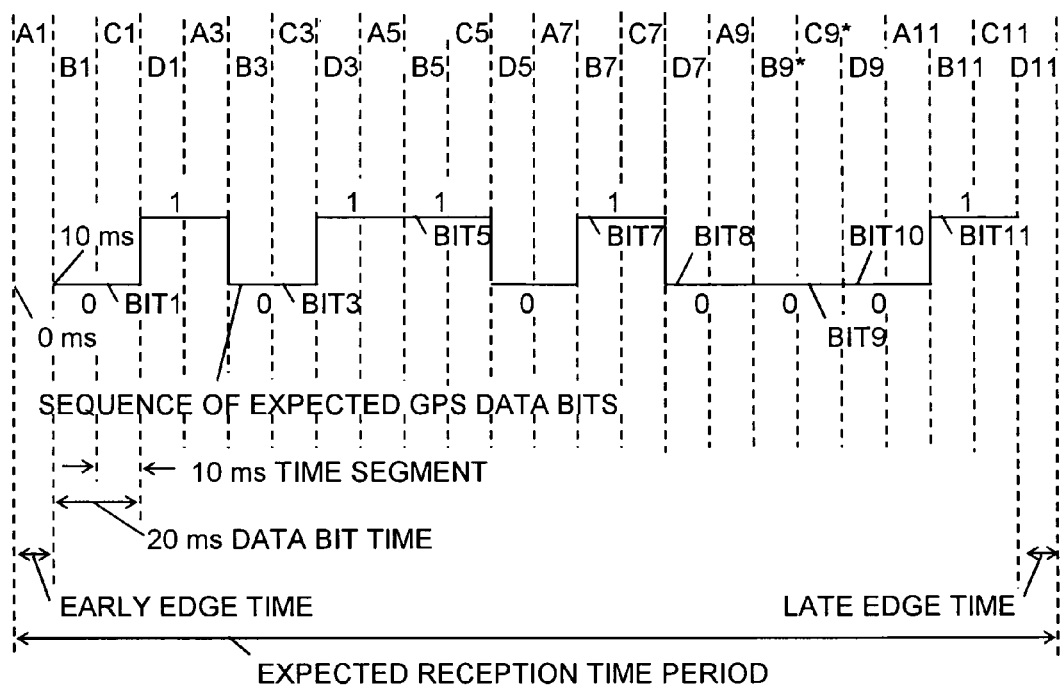
FIG. 6F is a time chart showing "A", "B", "C", and "D" time segments.

FIGS. 6D and 6E show the effect of a locally maintained GPS-based time that is late by 5 and 10 milliseconds, respectively, with respect to the sequence of expected data bits. Referring to FIG. 6D the start of the A1 time segment (t=0 ms) is 5 milliseconds after the start of the exemplary sequence. Even though the local time has a time error of 5 milliseconds, all of the "A" time segments A1-11 and the "A" augmentation time segments B4*, B8*, and B9* fall entirely within a data bit having the polarity of the expected data bit for that time segment. The depolarized incoming signal is integrated and when the correct code phase is used, the integration in the "A"

time period is shown by a line referred to as "A" integration. The "A" integration increases monotonically during the "A" time segments A1-11 and "A" augmentation time segments B4*, B8*, and B9* to form the "A" time period magnitude. For example, during the A1 time segment the "A" integration increases, during the B1 time segment the "A" integration is flat, during the A2 time segment the "A" integration increases, and so on until the "A" time period magnitude is reached. Note that the "A" integration increases during the "B" time segments that are used as "A" augmentation time segments B4*, B8*, and B9*.

The B1 time segment in FIG. 6D starts 10 ms after (t=10 ms) after the A1 time segment. The local time error of 5 milliseconds causes all of the "B" time segments B1-11 to straddle the transitions in the 20 ms data bits. When the depolarized incoming signal is integrated and the correct code phase is used, the integration in the "B" time period is shown by a line referred to as "B" integration. The "B" integration increases during the "B" augmentation time segments A5*, A9*, and A10 * but has no net increase during the "A" and "B" time segments (except for the "A" time segments that are used as "B" augmentation time segments) to form the "B" time period magnitude. For example, during the A1 time segment the "B" integration is flat, during the B1 time segment the "B" integration increases and then decreases for a net of zero, during the A2 time segment the "B" integration is flat, and so on until the "B" time period magnitude is reached. Note that the "B" integration increases during the "A" time segments that are used as "B" augmentation time segments A5*, A9*, and A10 * and the "B" time segments that are used as "A" augmentation time segments B4*, B8*, and B9*.

Referring to FIG. 6E the start of the A1 time segment (t=0 ms) is 10 milliseconds after the start of the exemplary sequence. Even though the local time has a time error of 10 milliseconds, all of the "A" time segments A1-11 and the "A" augmentation time segments B4*, B8*, and B9* fall entirely within a data bit having the polarity of the expected data bit for that time segment. The depolarized incoming signal is integrated and when the correct code phase is used, the integration in the "A" time period is shown by a line referred to as "A" integration. The "A" integration increases monotonically during the "A" time segments A1-11 and "A" augmentation time segments B4*, B8*, and B9* to form the "A" time period magnitude. For example, during the A1 time segment the "A" integration increases, during the B1 time segment the "A" integration is flat, during the A2 time segment the "A" integration increases, and so on until the "A" time period magnitude is reached. Note that the "A" integration increases during the "B" time segments that are used as "A" augmentation time segments B4*, B8*, and B9*.

The B1 time segment in FIG. 6E starts 10 ms after (t=10 ms) after the A1 time segment. The local time error of 10 milliseconds causes all of the "B" time segments B1-11 to fall in the next 20 data bit. When the depolarized incoming signal is integrated and the correct code phase is used, the integration in the "B" time period is shown by a line referred to as "B" integration. The "B" integration increases during the "B" augmentation time segments A5*, A9*, and A10 *, is flat during the "A" time segments (except for the "A" time segments that are used for "B" augmentation time segments) but decreases during the "B" time segments (except for the "B" time segments that are also used as "A" augmentation time segments) to form the "B" time period magnitude. For example, during the A1 time segment the "B" integration is flat, during the B1 time segment the "B" integration decreases, during the A2 time segment the "B" integration is flat, and so on until the "B" time period magnitude is reached.

Note that the "B" integration increases during the "A" time segments that are used as "B" augmentation time segments A5*, A9*, and A10 * and the "B" time segments that are used as "A" augmentation time segments B4*, B8*, and B9*.

For the local GPS-based time that is late with respect to the correct GPS-based time as shown in FIGS. 6D and 6E the "A" time period magnitude is greater than the "B" time period magnitude for 5 and 10 millisecond time errors, respectively. For a local GPS time that is early with respect to GPS-based time the time period magnitudes for "A" and "B" would be reversed and the "B" time period magnitude would be greater than the "A" time period magnitude.

FIG. 6F shows four types of time segments, termed "A", "B", "C", and "D", for an expected reception time period including the time period for the expected sequence and early and late edge times before and after, respectively, the expected sequence. The "A" time segments are shown as A1, A3, A5, A7, A9, and A11; the "B" time segments are shown as B1, B3, B5, B7, B9, and B11; and so on for "C" and "D" time segments. The first bit of the expected sequence is shown as bit 1; the third bit of the expected sequence is shown as bit 3; and so on with every other bit to bit 11. The time segments A1-11 odd, B1-11 odd, C1C1-11 odd, and D1-11 odd are shown in time with respect to the expected sequence for a time error of 0 ms. For a time error of 20 ms, the time segments A1-11 odd, B1-11 odd, C1C1-11 odd, and D1-11 odd shift 20 ms right or left with respect to the expected sequence depending upon the sign of the time error.

The A1, B1, C1, and D1 time segments are depolarized according to the sense of the known polarity for the expected bit 1; the A3, B3, C3, and D3 time segments are depolarized according to the sense of the known polarity for the expected bit 3; and so on to the A11, B11, C11, and D11 time segments depolarized according to the sense of the known polarity for the expected bit 11. The "A" time period magnitudes are the coherent integrations corresponding to code phases, respectively, for the A1, A3, A5, A7, A9, and A11 time segments; the "B" time period magnitudes are the coherent integrations corresponding to code phases, respectively, for the B1, B3, B5, B7, B9, and B11 time segments; and so on for "C" and "D" time period magnitudes.

The four types of time segments ("A", "B", "C", "D") shown in FIG. 6F can be extended to N time segment types where the time segments of each of the N time segment types alternates or follows one another as shown in FIG. 6F for N=4. Time periods for each of the N time segment types are separately integrated. Any one of the N types of time segments can be known as an Mth type of time segment. An Mth one of the time periods includes the integrations for the Mth type of time segments and may include Mth augmentation time segments.

For N=8 having "A", "B", "C", "D", "E", "F", "G" and "H" time segments, there would be A1, A5, and A9 time segments; B1, B5, and B9 time segments and so on to H1, H5, and H9 time segments. For N=8, the A1 through H1 time segments are arranged symmetrically about and depolarized for the first bit (bit 1) in a sequence, the A5 through H5 time segments are arranged symmetrically about and depolarized for the fifth bit (bit 5) in a sequence, and the A9 through H9 time segments are arranged symmetrically about and depolarized for the ninth bit (bit 9).

It should be seen by inspection that the time segments for at least one of the "A", "B", "C", and "D" time periods coincides with the expected data bits for up to a ±20 ms time error between the time segments based upon the local estimate of GPS-based time and the sequence of expected GPS data bits shown for actual GPS-based time. In addition, the sense of the known polarity of the data bits of the expected sequence does not change for a time error of up to ±20 ms for the B9 and the C9 time segments corresponding to the three consecutive data bits of bit 8, bit 9, and bit 10. Therefore, the B9 and C9 time segments are noted with an asterisk (*) to show that they can be used as "A" augmentation time segments and "D" augmentation time segments for determining the "A" and "D" time period magnitudes as described above for two types of time segments ("A" and "B"). For N=2, "A" and "B" augmentation time segments result from the "B" and "A" time segments corresponding to two consecutive data bits having the same sense; for N=4, "A" and "D" augmentation time segments result from the "B" and "C" time segments corresponding to three consecutive data bits having the same sense; for N=8 ("A", "B", "C", "D", "E", "F", "G" and "H"), "A", "B", "C", "F", "G" and "H" augmentation time segments result from the "D" and "E" time segments corresponding five consecutive data bits having the same sense; and so on for N, N/2+1 consecutive data bits having the same sense resulting in augmentation time segments for the first N/2−1 and the last N/2−1 types of time segments.

Doubling the number of time segment types halves the time accuracy requirement. For example, the use of four types of time segments ("A", "B", "C", "D") instead of two types or time segment ("A", "B") reduces the requirement for time accuracy from ±10 ms to ±20 ms; and the use of eight types (N=8) reduces the requirement for time accuracy to ±40 ms. However, doubling the number of time segment types also reduces the processing gain by 3 dB. For example, the use of four time segment types ("A", "B", "C", "D") instead of two time segment types ("A", "B") reduces the processing gain by 3 dB.

FIGS. 7A-I are flow charts showing several arrangements for the order in which representations of the incoming GPS signal are depolarized, separated for "A" and "B" time segments, and integrated for providing the "A" and "B" time period magnitudes for the potential code phases of the spreading code of the incoming signal. Although separations of "A" and "B" time segments are shown, it should be recognized that N types of time segments can be separated, for example N=4 for "A", "B", "C", and "D" time segment can be separated in the same way as for N=2 for "A" and "B" time segments. Several of the blocks in FIGS. 7A-I perform integrations of representations of the GPS signal. Those of ordinary skill in the art will appreciate that such integrations can be performed as a single period of time or can be performed in separate periods of time and then coherently accumulated.

In an embodiment shown in FIG. 7A, a block 702 depolarizes a representation of the incoming signal for the known polarities of the expected GPS data bits for providing a depolarized signal. A block 704 integrates the depolarized signal for time lengths not greater than the time segments for providing depolarized integrations. A block 706 separates the "A" time segments and the "B" time segments for the depolarized integrated signal for providing "A" and "B" depolarized integrations, respectively. Then, a block 708 further integrates (accumulates) the "A" depolarized integrations over the entire "A" time period for providing the "A" time period magnitudes and further integrates (accumulates) the "B" depolarized integrations over the entire "B" time period for providing the "B" time period magnitudes.

In an embodiment shown in FIG. 7B, a block 710 depolarizes a representation of the incoming signal for the known polarities of the expected GPS data bits for providing a depolarized signal. A block 712 separates the "A" time segments and the "B" time segments for the depolarized signal for providing an "A" depolarized signal and a "B" depolarized signal, respectively. Then, a block 714 integrates the "A" depolarized signal over entire "A" time period for providing the "A" time period magnitudes and integrates the "B" depolarized signal over the entire "B" time period for providing the "B" time period magnitudes.

In an embodiment shown in FIG. 7C, a block 720 integrates a representation of the incoming signal for time lengths not greater than the time segments for providing first integrations of the signal. A block 722 depolarizes the first integrations for the known polarities of the expected GPS data bits for providing depolarized integrations. A block 724 separates the depolarized integrations according to the "A" and "B" time segments for providing "A" and "B" depolarized integrations, respectively. Then, a block 726 further integrates the "A" depolarized integrations over the entire "A" time period for providing the "A" time period magnitudes and further integrates the "B" depolarized integrations over the entire "B" time period for providing the "B" time period magnitudes.

Figure 7D:
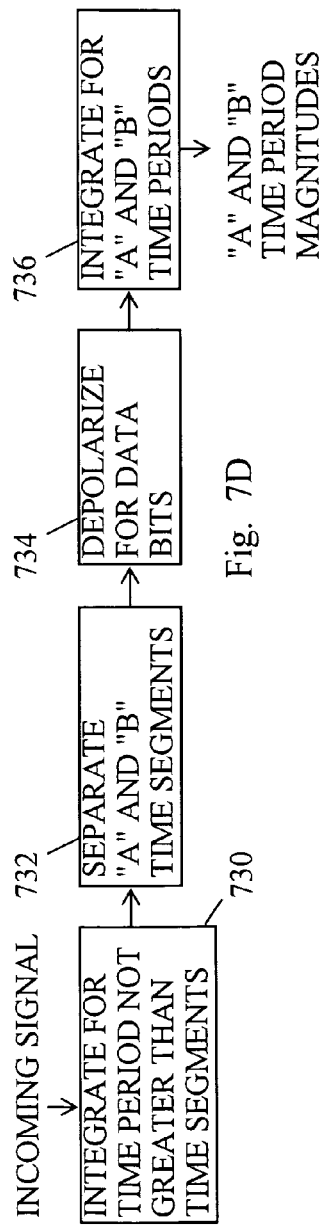

In an embodiment shown FIG. 7D, a block 730 integrates a representation of the incoming signal for time lengths not greater than the time segments for providing first integrations of the signal. A block 732 separates the first integrations according to the "A" and "B" time segments for providing "A" and "B" depolarized integrations, respectively. A block 734 depolarizes the "A" and "B" integrations for the known polarities of the expected GPS data bits for providing "A" and "B" depolarized integrations, respectively. Then, a block 736 further integrates the "A" depolarized integrations over the entire "A" time period for providing the "A" time period magnitudes and further integrates the "B" depolarized integrations over the entire "B" time period for providing the "B" time period magnitudes.

Figure 7E:
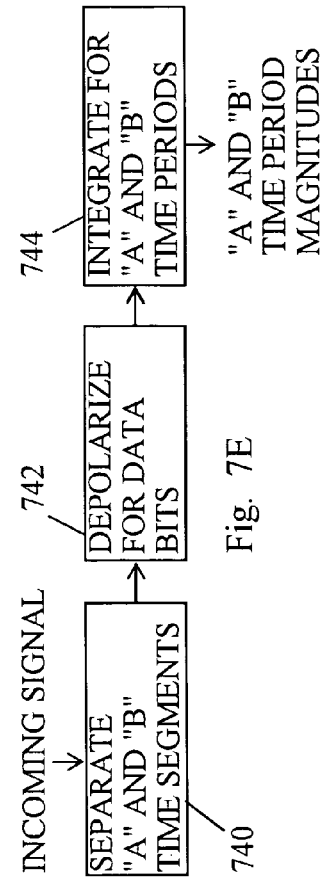

In an embodiment shown in FIG. 7E, a block 740 separates a representation of the incoming signal according to "A" and "B" time segments for providing "A" and "B" time segment signals, respectively. A block 742 depolarizes the "A" and "B" time segment signals for the known polarities of the expected GPS data bits for providing "A" and "B" depolarized time segment signals, respectively. Then, a block 744 integrates the "A" depolarized time segment signal over the entire "A" time period for providing the "A" time period magnitudes and integrates the "B" depolarized time segment signal over the entire "B" time period for providing the "B" time period magnitudes.

Figure 7F:
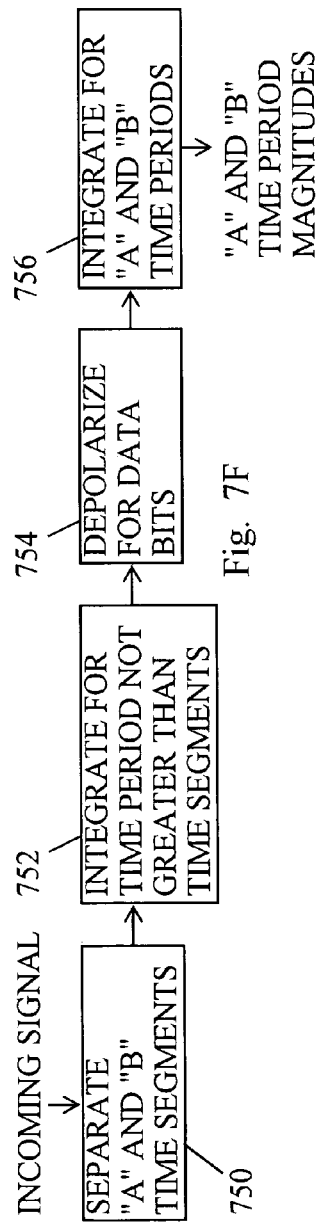

An embodiment shown in FIG. 7F, a block 750 separates a representation of the incoming signal according to "A" and "B" time segments for providing "A" and "B" time segment signals, respectively. A block 752 integrates the "A" and "B" time segment signals for time lengths not greater then time segments for providing "A" and "B" integrations, respectively. A block 754 depolarizes the "A" and "B" integrations for the known polarities of the expected GPS data bits for providing "A" and "B" depolarized integrations, respectively. Then, a block 756 further integrates the "A" depolarized integrations over the entire "A" time period for providing the "A" time period magnitudes and further integrates the "B" depolarized integrations over the entire "B" time period for providing the "B" time period magnitudes.

In an embodiment shown in FIG. 7G, a block 760 integrates a representation of the incoming signal for time lengths less than the time segments for providing first integrations, for example one epoch (1 ms for GPS C/A code). A block 762 depolarizes the first integrations for the known polarities of the expected GPS data bits for providing depolarized first integrations. A block 764 further integrates the depolarized first integrations for time lengths not greater than the time segments, preferably equal to a time segment (10 ms for GPS C/A code), for providing depolarized second integrations of the signal. A block 766 separates the depolarized second integrations according to "A" and "B" time segments for providing "A" and "B" depolarized second integrations, respectively. Then, a block 768 further integrates the "A" depolarized second integrations over the entire "A" time period for providing the "A" time period magnitudes and further integrates the "B" depolarized second integrations over the entire "B" time period for providing the "B" time period magnitudes. The embodiment of FIG. 7G differs from the embodiments of FIGS. 7A, 7C, 7D, BE, and 7I in that a representation of the GPS signal is depolarized between integration blocks for performing time segment integrations. Those of ordinary skill in the art will note that the embodiment of 7G effectively reduces to one of the embodiments illustrated in FIGS. 7A, 7C, 7D, BE, and 7I when the depolarization block 762 is placed elsewhere than between the integrations blocks 760 and 764. For example, when the block 762 is moved to a position before the block 760, the embodiment of FIG. 7G reduces to the embodiment illustrated in FIG. 7A.

In an embodiment shown in FIG. 7H, a block 770 integrates a representation of the incoming signal for time lengths less than the time segments for providing first integrations, for example one epoch (1 ms for GPS C/A code). A block 772 separates the first integrations according to "A" and "B" time segments for providing "A" and "B" first integrations, respectively. A block 774 depolarizes the "A" and "B" first integrations for the known polarities of the expected GPS data bits for providing "A" and "B" depolarized integrations, respectively. Then, a block 776 further integrates the "A" depolarized integrations over the entire "A" time period for providing the "A" time period magnitudes and further integrates the "B" depolarized integrations over the entire "B" time period for providing the "B" time period magnitudes.

In an embodiment shown in FIG. 7I, a block 780 integrates a representation of the incoming signal for time lengths less than the time segments for providing first integrations, for example one epoch (1 ms for GPS C/A code). A block 782 depolarizes the first integrations for providing depolarized integrations. A block 784 separates the depolarized integrations according to "A" and "B" time segments for providing "A" and "B" depolarized integrations, respectively. Then, a block 786 further integrates the "A" depolarized integrations over the entire "A" time period for providing the "A" time period magnitudes and further integrates the "B" depolarized integrations over the entire "B" time period for providing the "B" time period magnitudes.

FIG. 8 is a block diagram of an N processor referred to by a reference number 800 for processing N types of time segments. The N processor 800 for a special case of N=2 is described above as the AB processor 136. FIG. 8 illustrates the N processor 800 for N=4 for processing "A", "B", "C", and "D" types of time segments. The "A", "B", "C", and "D" types of time segments are illustrated in FIG. 6F and described in the accompanying detailed description. The N processor 800 receives I and Q integrations from the I and Q accumulators 166 of the time domain correlation machine 112A or the IFFT 180 of the frequency domain correlation machine 112B. One of the depolarizers 143-149 or 172 is in place for depolarizing the representation of the incoming signal each of the N types of time segments.

The N processor 800 includes an N switch 802, I accumulators 804, Q accumulators 805, and combiners 806. The N switch 802 separates the I and Q integrations for each of the N types of time segments into N types of time periods denoted for N=4 as "A", "B", "C", and "D" time periods. The "A" time period includes "A" time segments and "A" augmentation time segments (FIG. 6F); the "B" time period includes "B" time segments and "B" augmentation time segments; and so on for the "C" and "D" time segments and augmentation time segments. There are several variations (FIGS. 7A-I) regarding the placement of the N switch 802 within the GPS receiver 100 for separating the incoming signal. In one variation the N switch 802 separates the stored signal representation where the stored signal representation enters the correlation machine 112 from the signal memory 108. In this variation the correlation machine 112 integrates the stored signal representation for each of the N types of time segments and augmentation time segments separately from each of the other of the N types of time segments and augmentation time segments. In another variation the N switch 802 is disposed within the correlation machine 112 so that signal can be processed in time periods of up to the 10 ms time periods of the time segments before the N switch 802.

In an embodiment, the N switch 802 includes an I N switch 802I and a Q N switch 802Q. In FIG. 8, the I N switch 802I and the Q N switch 802Q are shown for the "B" time period. The I N switch 802I receives the depolarized I integrations from the I accumulator 166 for the time domain correlation machine 112A or the IFFT 180 for the frequency domain correlation machine 112B. Similarly, the Q N switch 802Q receives the depolarized Q integrations from the Q accumulator 166 for the time domain correlation machine 112A or the IFFT 180 for the frequency domain correlation machine 112B.

For N=4, the I accumulators 804 include four I accumulators denoted as an "A" I accumulator 804A, a "B" I accumulator 804B, a "C" I accumulator 804C, and a "D" I accumulator 804D. Similarly, the Q accumulators 805 include four Q accumulators denoted as an "A" Q accumulator 805A, a "B" Q accumulator 805B, a "C" Q accumulator 805C, and a "D" Q accumulator 805D. For the "A" time period, the I N switch 802I passes the depolarized I integrations to the "A" I accumulator 804A; for the "B" time period, the I N switch 802I passes the depolarized I integrations to the "B" I accumulator 804B; for the "C" time period, the I N switch 802I passes the depolarized I integrations to the "C" I accumulator 804C; and for the "D" time period, the I N switch 802I passes the depolarized I integrations to the "D" I accumulator 804D. Similarly, for the "A" time period, the Q N switch 802Q passes the depolarized Q integrations to the "A" Q accumulator 805A; for the "B" time period, the Q N switch 802Q passes the depolarized Q integrations to the "B" Q accumulator 805B; for the "C" time period, the Q N switch 802Q passes the depolarized Q integrations to the "C" Q accumulator 805C; and for the "D" time period, the Q N switch 802Q passes the depolarized Q integrations to the "D" Q accumulator 805D. The accumulators 804A-D accumulate the depolarized I integrations for providing I magnitude accumulations for each code phase. Similarly, the accumulators 805A-D accumulate the depolarized Q integrations for providing Q magnitude accumulation for each code phase.

For N=4, the N combiner 806 includes an "A" combiner 806A, a "B" combiner 806B, a C combiner 806C, and a "D" combiner 806D. The "A" combiner 806A adds the square of the "A" time period I accumulation from the "A" I accumulator 804A to the square of the "A" time period Q accumulation from the "A" Q accumulator 805A for each code phase increment for providing the "A" time period magnitudes; the "B" combiner 806B adds the square of the "B" time period I accumulation from the "B" I accumulator 804B to the square of the "B" time period Q accumulation from the "B" Q accumulator 805B; and so on for the "C" combiner 806C and the "D" combiner 806D. At this point using code phase increments of slightly less than one-half chip there will be preferably about 2048 "A" time period magnitudes, about 2048 "B" time period magnitudes, about 2048 "C" time period magnitudes, and about 2048 "D" time period magnitudes. As described above, the code phase increment that results in the strongest of the "A", "B", "C", or "D" time period magnitudes, or combination of the "A", "B", "C", and "D" time period magnitudes for a code phase is tested against a correlation threshold and used for signal acquisition when the correlation threshold is exceeded.

As described above the time period I and Q accumulations are preferably proportional to the levels for the I and Q integrations of the GPS signal, whereas the "A", "B", "C", and "D" time period magnitudes are preferably proportional to the sum of the squares the I and Q magnitude accumulations ($I^2+Q^2$). However, it should be noted that the "A", "B", "C", and "D" time period magnitudes can be some other convenient non-decreasing functions of the time period I and Q accumulations, such as the sum (I+Q) or the square root of the sum of the squares ($\sqrt{(I^2+Q^2)}$).

FIG. 9 is a block diagram of a signal receiver referred to by the general reference number 810. The receiver 810 is described in terms of a global positioning system (GPS) receiver for receiving incoming coarse/acquisition (C/A) GPS signals. However, those of ordinary skill the art of spread spectrum radio receivers will see that the block diagram illustrated in FIG. 9 and described below can be applied for receiving other types of signals, especially for receiving other types of direct fast sequence spread spectrum signals including precision P or P(Y) code GPS signals. The GPS receiver 810 includes the GPS antenna 102, the frequency downconverter 104, the reference generator 105, the sampler 106, the stored signal memory 108, the correlation machine 112, the microprocessor 114, the replica generator 138, and the program memory 116 including the stored sequence 122, the acquisition detector 811, and the signal and navigation program 126 as described above.

The GPS receiver 810 also includes an expected sequence timer 812, and an N timer 814. The sequence timer 812 uses the reference generator 105 for maintaining GPS time to within ±20/N ms for gating the sampler 106 and/or the signal memory 108 for storing the sampled downconverted GPS signal during the expected reception time period including the early and late edge times as shown in FIG. 6F. The sequence timer 812 also triggers the N timer 814 for generating N time segment signals for organizing the expected reception time period into N types of alternating 10 ms time segments as illustrated in FIGS. 6A-E for N=2 and FIG. 6F for N=4 and described in the accompanying detailed descriptions above.

The correlation machine 112 includes the N processor 800 illustrated in FIG. 8 and described above for the case of N=4. The correlation machine 112 including the N processor 800 integrates the stored signal representation of the GPS signal during the "A" time segments and "A" augmentation time segments for providing "A" time period magnitudes for each code phase, respectively; during the "B" time segments and "B" augmentation time segments for providing "B" time period magnitudes for each code phase, respectively; during the "C" time segments and "C" augmentation time segments for providing "C" time period magnitudes for each code phase, respectively; and during the "D" time segments and "B" augmentation time segments for providing for "D" time period magnitudes each code phase, respectively. The correlation machine 112 and integration process are illustrated and described in greater detail in FIGS. 3-4 and the accompanying descriptions above with the provision that the AB processor 136 is replaced by the N processor 800.

The N types of time period magnitudes, represented for N=4 by the "A" time period magnitudes, the "B" time period magnitudes, "C" time period magnitudes and the "D" time period magnitudes, from the correlation machine 112 are processed by the microprocessor 114 using instructions in the acquisition detector 811 for determining the increment of code phase for the replica code that appears to match the code phase of the incoming GPS signal. This replica code phase is then processed for GPS signal acquisition by the microprocessor 114 according to instructions in the signal and navigation program 126.

There are several embodiments for the acquisition detector 811 that can process the N types of time period magnitudes in order to find the code phase for acquisition. In an embodiment, the strongest of the time period magnitudes is tested against a correlation threshold. In another embodiment, the N types of time period magnitudes for a code phase are combined (incoherently) or their squares are added to form an N combined time period magnitude for that code phase. The code phase that resulted in the strongest of the time period magnitudes is tested against a correlation threshold. When the strongest time period magnitude exceeds the correlation threshold, the code phase that resulted in that combined time period magnitude is used for signal acquisition and tracking. Once the code phase for acquisition of the GPS signal from a single GPS satellite is determined, conventional methods can be used for acquiring the GPS signal from other GPS satellites. When the strongest magnitude does not exceed the required correlation threshold, then a different Doppler frequency, a different PRN code, a different GPS time, or the like is tried and the process is repeated; or the GPS receiver 810 may go into a standby mode to conserve power.

FIG. 10 is a block diagram of a signal receiver referred to with a general reference number 1000. The receiver 1000 is described in terms of a global positioning system (GPS) receiver for receiving incoming coarse/acquisition (C/A) GPS signals. However, those of ordinary skill in the art of spread spectrum radio receivers will see that the block diagram illustrated in FIG. 10 and described below can be applied for receiving direct sequence spread spectrum (DSSS) signals in general and especially for receiving GPS signals of other codes such the P or P/Y code, and for receiving Galileo signals, GLONASS signals, global navigation system satellite (GNSS) signals in general, and communication system CDMA signals.

The GPS receiver 1000 includes the GPS antenna 102, the frequency downconverter 104 including the reference generator 105, the sampler 106, the optional signal memory 108, the correlation machine 112 including the AB processor 136 and the replica generator 138, the microprocessor 114, the hardware for the program memory 116 having the firmware for the acquisition detector 124 and the signal and navigation program (SNP) 126, and the AB timer 134 that have been described above. The receiver 1000 also includes a data bit search generator 1002 for generating trial-and-error data bit search patterns that are used in the correlation machine 112. The correlation machine 112 uses the data bit search patterns for depolarizing the data bits of the incoming signal over several data bit time periods for determining an "A" magnitude set and a "B" magnitude set for each search pattern. The "A" magnitude set is a set of "A" magnitudes corresponding to code phase increments, respectively, of the incoming spread spectrum signal. Similarly, the "B" magnitude set is a set of "B" magnitudes for code phase increments, respectively, of the incoming spread spectrum signal. The data bit test patterns are illustrated described in FIGS. 12A and 12B for two and three data bit sequences and described in the accompanying detailed descriptions.

FIG. 11A is a flow chart of a method for acquiring spread spectrum signals using a trial-and-error data bit search with "A" and "B" time periods. The steps in the method may be embedded in a computer-readable form on a tangible medium 1100 that may be read by a computer, such as the microprocessor 114 in the GPS receiver 1000, for carrying out the steps. In a step 52 the incoming GPS signal is received. In a step 54 the GPS signal is downconverted and sampled.

Data bit search patterns are generated in a step 1102 for a trial-and-error search for determining a data bit pattern that matches the data bits carried in the incoming signal. The number of data bit search patterns is $2^{(n-1)}$ where n is number of data bit time lengths in the reception time length. In a step 1104 a reception time length for the incoming signal is established and organized into alternating "A" time segments and "B" time segments.

A representation of the downconverted, sampled incoming signal is depolarized in a step 1106 with the data bit search patterns to provide data bit search result signals. The incoming signal representation may be the downconverted sampled incoming signal directly as it is received in real-time from the step 54, or the representation may be the downconverted sampled incoming signal after it is stored in the signal memory 108. When the signal is stored in the signal memory 108 the same stored signal may be used to test for a first data bit search pattern and then retested for a second, third, fourth, and so on, data bit search pattern. The FIGS. 7A-I shows the blocks 702, 710, 722, 734, 742, 754, 762, 774 or 782 for the signal flow position where the incoming signal representation is depolarized. FIG. 13 shows structural blocks 143-149 for depolarizing the signal representation for a time domain system. FIG. 14 shows structural blocks 143, 144, 146, 147 or 172 for depolarizing the signal representation for a frequency domain system.

The search result signals for the "A" time segments are integrated in a step 1112 for determining "A" magnitude sets. Each data bit search pattern results in a set of "A" magnitudes (also called correlation magnitudes or time period magnitudes herein). Each "A" magnitude corresponds to the correlation between a replica signal (from the replica generator 138) and the downconverted sampled signal (from the sampler 106) for a code phase increment for the replica signal. Similarly, the search result signals for the "B" time segments are integrated in a step 1114 for determining "B" magnitude sets. Each data bit search pattern results in a set of "B" magnitudes (also called correlation magnitudes or time period magnitudes herein). Each "B" magnitude corresponds to the correlation between a replica signal (from the replica generator 138) and the downconverted sampled signal (from the sampler 106) for a code phase increment for the replica signal. FIGS. 7A-I shows blocks 708, 714, 726, 736, 746, 756, 768, 778 or 786 for the signal flow for integrating the data bit search result signals.

It should be noted that for incoming signal acquisition, it may be necessary to repeat the process of steps 1106, 1112 and 1114 for each potential carrier frequency.

For example, a first data bit search pattern is generate in the step 1102. The first pattern is used to depolarize the incoming signal representation in the step 1106 to provide a first data bit search result signal. In the step 1112 correlations are determined on the first data bit search result for each code phase increment and the correlations are accumulated for the code phase increment throughout the "A" time segments in the reception time length to provide the "A" magnitudes for the code phase increments, respectively. Similarly, in the step 1114 correlations are determined on the first data bit search result for each code phase increment and the correlations are accumulated for the code phase increment throughout the "B" time segments in the reception time length to provide the "B" magnitudes for the code phase increments, respectively.

Then, a second data bit search pattern is generated in the step 1102. The second pattern is used to depolarize the incoming signal representation in the step 1106 to provide a second data bit search result signal. In the step 1112 correlations are determined on the second data bit search result for each code phase increment and the correlations are accumulated for the code phase increment throughout the "A" time segments in the reception time length to provide the "A" magnitudes for the code phase increments, respectively. Similarly, in the step 1114 correlations are determined on the second data bit search result for each code phase increment and the correlations are accumulated for the code phase increment throughout the "B" time segments in the reception time length to provide the "B" magnitudes for the code phase increments, respectively. This process is continued for however many patterns are required. The result is an "A" magnitude for each data bit pattern for each code phase increment and a "B" magnitude for each data bit pattern for each code phase increment.

The process of accumulating correlations is continued for each data bit search pattern until "A" and "B" magnitude sets have been determined for all $2^{(n-1)}$ search patterns where n is the number of data bit time lengths in the signal reception time length.

The code phase increment that results in the strongest of the magnitudes (the greatest correlation) is identified in the step 70. Then, in a step 1116 the code phase increment corresponding to the strongest magnitude is used for receiving the incoming signal so that the signal can be acquired and/or tracked after the signal is acquired in order to determine the location where the signal is received.

The "A" depolarized signal representations are integrated (coherently accumulated) in the step 1112 for an "A" time period including all the "A" time segments for providing the "A" (time period) magnitudes. Similarly, in the step 1114 the "B" depolarized signal representations are integrated (coherently accumulated) for a "B" time period including all the "A" time segments for providing the "B" (time period) magnitudes. The signal integrations for the "A" time period provide "A" magnitudes corresponding to the potential code phase increments, respectively, and the signal integrations for the "B" time period provide "B" magnitudes corresponding to the same potential code phase increments, respectively. Then, in the step 70 described above, the code phase increment that results in the strongest of the "A" or "B" magnitudes is tested against a correlation threshold and used for signal acquisition and/or tracking when a correlation threshold is exceeded. In order to find a time period magnitude that exceeds the correlation threshold the steps may need to be iterated using different assumptions for carrier frequency.

FIG. 11B is a flow chart of a method for acquiring spread spectrum signals using a trial-and-error data bit search with "A" and "B" time periods. The steps in the method may be embedded in a computer-readable form on a tangible medium 1150 that may be read by a computer, such as the microprocessor 114 in the GPS receiver 1000, for carrying out the steps. The operation of an embodiment can be stated as follows.

Step 1152. Organize and establish a reception time length of two or more data bits into a series of alternating A and B time segments, each time segment being ½ data bit time (in C/A code the time segments are 10 ms and the time length of 2 or 3 data bits is 40 or 60 ms). Either A time segments or B time segments will always avoid data bit transitions.

Step 1154. Organize and establish an A non-continuous time period to include all A time segments and a B non-continuous time period to include all B time segments. The "A" and "B" time segments alternate.

Step 1156. Perform coherent integration for each code phase increment (with each carrier frequency if necessary) for each data bit sequence case for the A time period and the B time period to accumulate the magnitude of the correlation level for each code phase increment (for each carrier frequency if necessary) for each data bit sequence case (each data bit search pattern) for the A time period and a correlation level for each code phase increment (for each carrier frequency if necessary) for each data bit sequence case for the B time period. The step 1156 can be performed with standard time domain search or frequency transforms or combination of time domain search and frequency transforms. The coherent integration is performed by correlating spreading code chips of the incoming signal representation with spreading code chips of a replica signal at each code phase increment and accumulating the correlations throughout the "A" time period and independently throughout the "B" time period.

Step 1158. Use the correlation levels to select the correct code phase increment. For example, choose the code phase increment (and carrier frequency) from the sequence (data bit search pattern) from either the A or B time period that corresponds to the strongest—largest absolute value—correlation level.

FIG. 12A is a time chart showing "A" and "B" time segments and showing the accumulated "A" and "B" magnitudes for a reception time length having two data bit time lengths. For the GPS C/A the data bit time length is 20 milliseconds. The "A" and "B" time segment lengths are one-half of the data bit time length. For the GPS C/A code, the time segment length is 10 milliseconds. An exemplary actual, but unknown, data bit pattern for the incoming signal is shown as 01 followed by a 0. The timing is arbitrarily shown for the data bit transitions falling midway during the "B" time segments.

The data bit generator 1002 generates two data bit search patterns—a 1st data bit pattern of 00 or its inverse of 11, and a 2nd data bit pattern of 01 or its inverse of 10. Because either a strong positive or a strong negative value for magnitude equally shows correlation, it is not necessary to generate or test both a pattern and its inverse pattern. Each of the two patterns—00 and 01—are used for depolarizing the incoming signal representation for determining data bit search results.

The accumulated "A" and "B" magnitudes are shown for the correct code phase increment (and carrier frequency) when the data bit search pattern is correct (the 2nd data bit search pattern in this example). The "A" magnitude accumulates to an increasingly greater value as the correlations for more code epochs (for GPS C/A there are 20 code epochs per data bit) are accumulated for the correct data bit search pattern at the correct code phase increment (and carrier frequency). The "B" magnitudes, even for the correct data bit search pattern and the correct code phase increment (and carrier frequency) do not accumulate a stronger value when a data bit transition inverts the accumulation because the portion of the accumulation after the transition subtracts from the portion of the accumulation before the transition.

Case 00 or 11. Assume no transition. Perform coherent integration throughout first A time segment, do not invert, then continue coherent integration throughout second A time segment to determine correlation levels for the A time period. Similarly for B time segments.

Case 01 or 10. Assume a transition. Perform coherent integration throughout first A time segment, invert, then continue coherent integration throughout second A time segment to determine correlation levels for A time period. Similarly for B time segments.

FIG. 12B is a time chart showing "A" and "B" time segments and showing "A" and "B" magnitudes for a reception time length having three data bit time lengths. For the GPS C/A the data bit time length is 20 milliseconds. The "A" and "B" time segment lengths are one-half of the data bit time length. For the GPS C/A the time segment length is 10 milliseconds. An exemplary actual, but unknown, data bit pattern for the incoming signal is shown as 101 followed by a 0. The timing is arbitrarily shown for the data bit transitions falling midway during the "B" time segments.

The data bit generator 1002 generates four data bit search patterns—a 1st data bit pattern of 000 or its inverse 111, a 2nd data bit pattern of 001 or its inverse 110, a 3rd data bit pattern of 101 or its inverse 010, and a 4th data bit pattern of 011 or its inverse 100. Because either a strong positive or a strong negative value for magnitude equally shows correlation, it is not necessary to generate or test both a pattern and its the inverse. Each of the four patterns—000, 001, 101 and 011—are used for depolarizing the incoming signal representation for determining data bit search results.

The "A" and "B" magnitudes are shown for the correct code phase increment (and carrier frequency) when the data bit search pattern is correct (the 3rd data bit search pattern in this example). The "A" magnitude accumulates to an increasingly greater value as the correlations for more code epochs (for GPS C/A there are 20 code epochs per data bit) are accumulated for the correct data bit search pattern at the correct code phase increment (and carrier frequency). The "B" magnitudes, even for the correct data bit search pattern and the correct code phase increment (and carrier frequency) do not accumulate a stronger value when a data bit transition inverts the accumulation so that the portion of the accumulation after the transition subtracts from the portion of the accumulation before the transition.

Case 000 or 111) Perform coherent integration throughout first A time segment; do not invert, then continue coherent integration throughout second A time segment; do not invert, then continue coherent integration throughout third A time segment to determine correlation levels for A time period. Similarly for B time segments to determine correlation levels for B time period.

Case 001 or 110) Perform coherent integration throughout first A time segment; do not invert, then continue coherent integration throughout second A time segment; invert, then continue coherent integration throughout third A time segment to determine correlation levels for A time period. Similarly for B time segments to determine correlation levels for B time period.

Case 010 or 101) Perform coherent integration throughout first A time segment; invert, then continue coherent integration throughout second A time segment; invert, then continue coherent integration throughout third A time segment to determine correlation levels for A time period. Similarly for B time segments to determine correlation levels for B time period.

Case 011 or 100) Perform coherent integration throughout first A time segment; invert, then continue coherent integration throughout second A time segment; do not invert, then continue coherent integration throughout third A time segment to determine correlation level levels for A time period. Similarly for B time segments to determine correlation levels for B time period.

FIG. 13 is a block diagram showing the signal memory 108, the time domain correlation machine 112A (FIG. 3) and the data bit search generator 1002. The structures, functions and results of the elements of the correlation machine 112A are described above in detail. The data bit generator 1002 generates the data bit search patterns used by one of the elements 143, 144, 145, 146, 147, 148 or 149 for depolarizing the incoming signal representation.

FIG. 14 is a block diagram showing the signal memory 108, the frequency domain correlation machine 112B (FIG. 4) and the data bit search generator 1002. The structures, functions and results of the correlation machine 112B are described above in detail. The data bit generator 1002 generates the data bit search patterns used by one of the elements 143, 144, 146, 147 or 172 for depolarizing the incoming signal representation.

FIG. 15 is a flow chart for an embodiment using the GPS C/A code as an exemplary case. The steps in the method may be embedded in a computer-readable form on a tangible medium 1500 that may be read by a computer, such as the microprocessor 114 in the receiver 1000, for carrying out the steps. The method may be implemented in the correlation machines 112A or 112B. In a step 1502 the code correlations for offsets of each code phase increment between the spreading codes of a replica signal and the incoming signal are accumulated for I and Q for one-half the time length of a data bit for a first "A" time segment. The first "A" time segment accumulations for I and Q are remembered for each code phase increment. Similarly, in a step 1506 the code correlations for offsets of each code phase increment between the spreading codes of a replica signal and the incoming signal are accumulated for I and Q for one-half the time length of a data bit for a first "B" time segment. The first "B" time segment accumulations are remembered for I and Q for each code phase increment.

In a step 1512 the code correlations for offsets of each code phase increment between the spreading codes of a replica signal and the incoming signal are accumulated for I and Q for one-half the time length of a data bit for a second "A" time segment. The second "A" time segment accumulations for I and Q are remembered for each code phase increment. Similarly, in a step 1516 the code correlations for offsets of each code phase increment between the spreading codes of a replica signal and the incoming signal are accumulated for I and Q for one-half the time length of a data bit for a first "B" time segment. The second "B" time segment accumulations are remembered for I and Q for each code phase increment.

In a step 1522 the second "A" time segment accumulations are depolarized according to the first data bit search pattern. The depolarization inverts the second "A" time segment accumulations when the second bit of the first search pattern is different than the first bit. When the second bit of the first search pattern is the same as the first bit, the depolarization does not invert the second "A" time segment accumulations. For example the data bit search pattern of 01 would cause the second "A" time segment accumulations to be inverted and the data bit search pattern of 00 would not cause second "A" time segment accumulations to be inverted. Similarly, the second "B" time segment accumulations are depolarized according to the first data bit search pattern. The depolarization inverts the second "B" time segment accumulations when the second bit of the first search pattern is different than the first bit. When the second bit of the first search pattern is the same as the first bit, the depolarization does not invert the second "B" time segment accumulations.

In a step 1524, for the first data bit search pattern, the I first "A" time segment accumulations are added to the depolarized second "A" time segment accumulations for I for each code phase increment, respectively. The Q first "A" time segment accumulations are added to the Q depolarized second "A" time segment accumulations for each code phase increment, respectively. Similarly, the I first "B" time segment accumulations are added to the I depolarized second "B" time segment accumulations for each code phase increment, respectively. The Q first "B" time segment accumulations are added to the Q depolarized second "B" time segment accumulations for each code phase increment, respectively. In a step 1526, for the first search pattern, first "A" magnitudes are computed from the sum of the squares of the I and Q for each code phase increment. Similarly, for the first search pattern, first "B" magnitudes are computed from the sum of the squares of the I and Q for each code phase increment.

In a step 1532 the second "A" time segment accumulations are depolarized according to the second data bit search pattern. The depolarization inverts the second "A" time segment accumulations when the second bit of the second search pattern is different than the first bit. When the second bit of the second search pattern is the same as the first bit, the depolarization does not invert the second "A" time segment accumulations. Similarly, the second "B" time segment accumulations are depolarized according to the second data bit search pattern. The depolarization inverts the second "B" time segment accumulations when the second bit of the second search pattern is different than the first bit. When the second bit of the second search pattern is the same as the first bit, the depolarization does not invert the second "B" time segment accumulations.

In a step 1534, for the second data bit search pattern, the I first "A" time segment accumulations are added to the I depolarized second "A" time segment accumulations for each code phase increment, respectively. The Q first "A" time segment accumulations are added to the Q depolarized second "A" time segment accumulations for each code phase increment, respectively. Similarly, the I first "B" time segment accumulations are added to the I depolarized second "B" time segment accumulations for each code phase increment, respectively. The Q first "B" time segment accumulations are added to the Q depolarized second "B" time segment accumulations for each code phase increment, respectively. In a step 1536, for the second search pattern, second "A" magnitudes are computed from the sum of the squares of the I and Q for each code phase increment. Similarly, for the second search pattern, second "B" magnitudes are computed from the sum of the squares of the I and Q for each code phase increment.

When the data bit search pattern time length is n data bits where n is greater than two, the above steps are repeated in a step 1540 for accumulating the I and Q code correlations at the code phase increments for the code epochs in the "A" and "B" time segments for each of the data bits up to n; depolarizing the accumulations according to the senses of the nth data bit of the search pattern; adding the depolarized accumulations for the $2^{(n-1)}$ search patterns, respectively; and computing the 1 to $2^{(n-1)}$ "A" and "B" magnitudes from the sums of the squares of the I and Q of the added depolarized accumulations.

In a step 1542 the strongest (generally the largest) of the first through $2^{(n-1)}$ "A" or "B" magnitudes is determined. The particular code phase increment that corresponds to the largest of these magnitudes is used for receiving the incoming signal, acquiring the incoming signal, tracking of the incoming signal, and/or determining the time-of-arrival of the incoming signal in order to determine the location where the signal is being received.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the broadest reading of the appended claims define the true idea and scope of the invention.

The below listed claims derive support from and must be read in view of the whole specification and all the drawing figures.

What is claimed is:

1. A method implemented in a receiver for receiving an incoming signal having data bits spread by a spreading code, comprising:
   integrating said incoming signal at code phase increments of said spreading code with two or more data bit search patterns in an "A" integration time period comprising at least two non-contiguous "A" time segments for determining magnitudes corresponding to said code phase increments, respectively, for each of said search patterns;
   integrating said incoming signal at said code phase increments with said search patterns for a "B" integration time period comprising "B" time segments alternating with said "A" time segments for determining magnitudes corresponding to said code phase increments, respectively, for each of said search patterns; and
   using a largest of said magnitudes for determining a particular one of said code phase increments for receiving said incoming signal.

2. The method of claim 1, further comprising:
   generating $2^{(n-1)}$ said search patterns where said n is the number of data bit time lengths in a signal reception time length.

3. The method of claim 1, further comprising:
   establishing said alternating "A" and "B" time segments for a signal reception time length of two or more said data bits; and wherein:
   integrating includes depolarizing a representation of said incoming signal with said search patterns for providing "A" and "B" said magnitudes corresponding to said "A" and "B" integration time periods, respectively.

4. The method of claim 1, wherein:
   said search patterns include 00 or its inverse and 01 or its inverse when a signal reception time length is about two said data bit time lengths.

5. The method of claim 1, wherein:
   said search patterns include 000 or its inverse, 001 or its inverse, 010 or its inverse and 100 or its inverse when a signal reception time length is about three data bit time lengths.

6. The method of claim 1 wherein:
   a first of said search patterns has a no inversion between a first and a second bit for providing first "A" said magnitudes for said "A" integration time period and first "B" said magnitudes for said "B" integration time period; and a second of said search patterns has an inversion between said first and said second bit for providing second "A" said magnitudes for said "A" integration time period and second "B" said magnitudes for said "B" integration time period.

7. The method of claim 1, wherein:
   a first of said search patterns has no inversion between a first and a second bit and no inversion between said second and a third bit for providing first "A" said magnitudes for said "A" integration time period and first "B" said magnitudes for said "B" integration time period; a second of said search patterns has no inversion between said first and said second bit and an inversion between said second and said third bit for providing second "A" said magnitudes for said "A" integration time period and second "B" said magnitudes for said "B" integration time period; a third of said search patterns has an inversion between said first and said second bit and an inversion between said second and said third bit for providing third "A" said magnitudes for said "A" integration time period and third "B" said magnitudes for said "B" integration time period; and a fourth of said search patterns has an inversion between said first and said second bit and no inversion between said second and said third bit for providing fourth "A" said magnitudes for said "A" integration time period and fourth "B" said magnitudes for said "B" integration time period.

8. The method of claim 1, wherein:
   said time segments have time lengths about one-half a time length of said data bits.

9. The method of claim 1, wherein:
   said incoming signal is a global navigation satellite system (GNSS) signal.

10. The method of claim 1; wherein:
    integrating includes performing code phase increment-by-increment code correlations between and said spreading code of said incoming signal and a local replica of said spreading code; and accumulating said code correlations through several code epochs of said spreading code during said "A" time segments for determining "A" said magnitudes and through several code epochs of said spreading code during said "B" time segments for determining "B" said magnitudes.

11. The method of claim 1, wherein:
    integrating said incoming signal includes accumulating first "A" and "B" code correlations corresponding to said code phase increments during first said "A" and first said "B" time segments for several epochs of said spreading code; and continuing accumulating from said first "A" and "B" code correlations at said code phase increments during second said "A" and "B" time segments for several more epochs for providing "A" said magnitudes and "B" said magnitudes corresponding to said code phase increments.

12. The method of claim 11, wherein:
    said continuing accumulating includes inverting "A" and "B" code correlations during said second "A" and "B" time segments.

13. A receiver for acquiring an incoming signal having data bits spread by a spreading code, comprising:
    a correlation machine to integrate said incoming signal at code phase increments of said spreading code with two or more data bit search patterns in an "A" integration time period comprising at least two non-contiguous "A" time segments for determining magnitudes corresponding to said code phase increments, respectively, for each of said search patterns;
    the correlation machine further to integrate said incoming signal at said code phase increments with said search patterns for a "B" integration time period comprising "B" time segments alternating with said "A" time segments for determining magnitudes corresponding to said code phase increments, respectively, for each of said search patterns; and a navigation signal processor configured to use a largest of said magnitudes for determining a particular one of said code phase increments for receiving said incoming signal.

14. The receiver of claim 13, further comprising:
a data bit generator to generate $2^{(n-1)}$ said search patterns where said n is the number of data bit time lengths in a signal reception time length.

15. The receiver of claim 13, further comprising:
an AB timer to establish said alternating "A" and "B" time segments for a signal reception time length of two or more said data bits; and wherein:
the correlation machine further includes a depolarizer to depolarize a representation of said incoming signal with said search patterns to provide "A" and "B" said magnitudes corresponding to said "A" and "B" integration time periods, respectively.

16. The receiver of claim 13, further comprising:
a data bit generator to generate said search patterns including 00 or its inverse and 01 or its inverse when a signal reception time length is about two said data bit time lengths.

17. The receiver of claim 13, further comprising:
a data bit generator to generate said search patterns including 000 or its inverse, 001 or its inverse, 010 or its inverse and 100 or its inverse when a signal reception time length is about three data bit time lengths.

18. The receiver of claim 13, further comprising:
a data bit generator to generate a first of said search patterns having no inversion between a first and a second bit for providing first "A" said magnitudes for said "A" integration time period and first "B" said magnitudes for said "B" integration time period; and
a second of said search patterns having an inversion between said first and said second bit for providing second "A" said magnitudes for said "A" integration time period and second "B" said magnitudes for said "B" integration time period.

19. The receiver of claim 13, further comprising:
a data bit generator to generate a first of said search patterns having no inversion between a first and a second bit and no inversion between said second and a third bit for providing first "A" said magnitudes for said "A" integration time period and first "B" said magnitudes for said "B" integration time period; a second of said search patterns having no inversion between said first and said second bit and an inversion between said second and said third bit for providing second "A" said magnitudes for said "A" integration time period and second "B" said magnitudes for said "B" integration time period; a third of said search patterns having an inversion between said first and said second bit and an inversion between said second and said third bit for providing third "A" said magnitudes for said "A" integration time period and third "B" said magnitudes for said "B" integration time period; and a fourth of said search patterns having an inversion between said first and said second bit and no inversion between said second and said third bit for providing fourth "A" said magnitudes for said "A" integration time period and fourth "B" said magnitudes for said "B" integration time period.

20. The receiver of claim 13, further comprising:
an AB timer to establish said time segments having time lengths about one-half a time length of said data bits.

21. The receiver of claim 13, wherein:
said incoming signal is a global navigation satellite system (GNSS) signal.

22. The receiver of claim 13, wherein:
the correlation machine is configured to perform code phase increment-by-increment code correlations between and said spreading code of said incoming signal and a local replica of said spreading code; and accumulating said code correlations through several code epochs of said spreading code during said "A" time segments for determining "A" said magnitudes and through several code epochs of said spreading code during said "B" time segments for determining "B" said magnitudes.

23. The receiver of claim 13, wherein:
the correlation machine is configured to integrate said incoming signal by accumulating first "A" and "B" code correlations corresponding to said code phase increments during first said "A" and "B" time segments for several epochs of said spreading code; and continuing accumulating from said and "B" code correlations at said code phase increments during second said "A" and "B" time segments for several more epochs for providing "A" said magnitudes and "B" said magnitudes corresponding to said code phase increments.

24. The receiver of claim 23, wherein:
the correlation machine is further configured to invert said "A" and "B" code correlations during said second "A" and "B" time segments.

* * * * *